United States Patent
Noyes

(10) Patent No.: US 10,713,669 B2
(45) Date of Patent: Jul. 14, 2020

(54) METHODS AND SYSTEMS FOR SIGNALS MANAGEMENT

(71) Applicant: Commerce Signals, Inc., Davidson, NC (US)

(72) Inventor: Thomas Noyes, Davidson, NC (US)

(73) Assignee: COMMERCE SIGNALS, INC., Davidson, NC (US)

(*) Notice: Subject to any disclaimer, the term of this patent is extended or adjusted under 35 U.S.C. 154(b) by 0 days.

(21) Appl. No.: 14/214,253

(22) Filed: Mar. 14, 2014

(65) Prior Publication Data

US 2014/0278763 A1    Sep. 18, 2014

Related U.S. Application Data

(60) Provisional application No. 61/791,297, filed on Mar. 15, 2013.

(51) Int. Cl.
| | |
|---|---|
| *G06Q 30/00* | (2012.01) |
| *G06Q 30/02* | (2012.01) |
| *G06Q 30/06* | (2012.01) |
| *G06Q 30/08* | (2012.01) |
| *G06Q 40/04* | (2012.01) |

(52) U.S. Cl.
CPC ..... *G06Q 30/0201* (2013.01); *G06Q 30/0202* (2013.01); *G06Q 30/0206* (2013.01); *G06Q 30/0244* (2013.01); *G06Q 30/06* (2013.01); *G06Q 30/08* (2013.01); *G06Q 40/04* (2013.01)

(58) Field of Classification Search
CPC ........... G06Q 30/0255; G06Q 30/0235; G06Q 10/105; G06Q 10/103; G06Q 10/067; G06Q 30/02; G06Q 10/06315; G06Q 40/00; G06Q 30/00; G06Q 30/06; H04Q 7/20

USPC ............................................... 705/7.11–7.42
See application file for complete search history.

(56) References Cited

U.S. PATENT DOCUMENTS

| | | |
|---|---|---|
| 5,077,665 A | 12/1991 | Silverman et al. |
| 6,216,129 B1 | 4/2001 | Eldering |
| 6,275,824 B1 | 8/2001 | O'Flaherty et al. |
| 6,324,519 B1 | 11/2001 | Eldering |

(Continued)

FOREIGN PATENT DOCUMENTS

| | | |
|---|---|---|
| EP | 2063387 A1 | 5/2009 |
| EP | 2076877 A1 | 7/2009 |

OTHER PUBLICATIONS

Bui et al., A Multi-Attribute Negotiation Support System with Market Signaling for Electronic Markets, Journal: Group Decision and Negotiation; Issue Jun. 2001, p. 515-537, http://fulltext.calis.edu.cn/kluwer/pdf/09262644/10/383020.pdf.*

(Continued)

*Primary Examiner* — Patricia H Munson
*Assistant Examiner* — Uche Byrd
(74) *Attorney, Agent, or Firm* — Neo IP

(57) ABSTRACT

Methods and systems for managing signals by signal owners. Signals are indicators of data that are derived from data sources and abstracted to protect the underlying data. The signal owner first converts its own underlying data into a "signal" or indicator that represents the data without disclosing it or providing it. Signal sellers determine if they wants share signals based upon buyer, price, and other rules, including limitations on signal use. Signal buyers determine signal value based upon their objectives.

45 Claims, 7 Drawing Sheets

(56) References Cited

U.S. PATENT DOCUMENTS

| | | |
|---|---|---|
| 6,363,488 B1 | 3/2002 | Ginter et al. |
| 6,381,602 B1 | 4/2002 | Shoroff et al. |
| 6,850,900 B1 | 2/2005 | Hare et al. |
| 7,233,948 B1 | 6/2007 | Shamoon et al. |
| 7,630,986 B1 | 12/2009 | Herz et al. |
| 8,224,725 B2 | 7/2012 | Grim et al. |
| 8,229,902 B2 | 7/2012 | Vishniac et al. |
| 8,285,610 B2 | 10/2012 | Engle et al. |
| 8,380,738 B2 | 2/2013 | Tatemura et al. |
| 8,812,355 B2 | 8/2014 | Angell et al. |
| 8,914,903 B1 | 12/2014 | Lee et al. |
| 9,799,042 B2 | 10/2017 | Noyes |
| 2001/0004733 A1 | 6/2001 | Eldering |
| 2003/0115129 A1* | 6/2003 | Feaver ............... G06Q 30/06 705/37 |
| 2003/0144924 A1 | 7/2003 | McGee |
| 2004/0148290 A1 | 7/2004 | Merenda et al. |
| 2004/0267630 A1* | 12/2004 | Au ............... G06Q 30/06 705/80 |
| 2005/0004789 A1 | 1/2005 | Summers |
| 2005/0044423 A1* | 2/2005 | Mellmer ............... G06F 21/31 726/4 |
| 2005/0177742 A1 | 8/2005 | Benson et al. |
| 2006/0167779 A1* | 7/2006 | Turner ............... G06Q 40/00 705/35 |
| 2006/0168059 A1 | 7/2006 | Chang et al. |
| 2006/0200556 A1* | 9/2006 | Brave ............... G06F 17/30867 709/224 |
| 2006/0230053 A1 | 10/2006 | Eldering |
| 2007/0011050 A1 | 1/2007 | Klopf et al. |
| 2007/0067297 A1 | 3/2007 | Kublickis |
| 2007/0110240 A1 | 5/2007 | Moskowitz et al. |
| 2007/0130070 A1 | 6/2007 | Williams |
| 2007/0174119 A1 | 7/2007 | Ramsey et al. |
| 2007/0208630 A1* | 9/2007 | Chatter ............... G06Q 30/0241 705/26.3 |
| 2008/0059624 A1 | 3/2008 | Groz et al. |
| 2008/0103795 A1 | 5/2008 | Jakubowski et al. |
| 2008/0103902 A1 | 5/2008 | Burdick et al. |
| 2008/0189232 A1 | 8/2008 | Dunning et al. |
| 2009/0018918 A1 | 1/2009 | Moneypenny et al. |
| 2009/0132353 A1 | 5/2009 | Maggenti et al. |
| 2009/0177591 A1 | 7/2009 | Thorpe et al. |
| 2009/0222329 A1 | 9/2009 | Ramer et al. |
| 2009/0228397 A1 | 9/2009 | Tawakol et al. |
| 2009/0234711 A1 | 9/2009 | Ramer et al. |
| 2009/0240568 A1 | 9/2009 | Ramer et al. |
| 2009/0240569 A1 | 9/2009 | Ramer et al. |
| 2009/0307085 A1 | 12/2009 | Lejano et al. |
| 2009/0327150 A1 | 12/2009 | Flake et al. |
| 2010/0156933 A1 | 6/2010 | Jones et al. |
| 2010/0262497 A1 | 10/2010 | Karlsson |
| 2010/0317420 A1 | 12/2010 | Hoffberg |
| 2011/0137786 A1 | 6/2011 | Lutnick et al. |
| 2011/0178845 A1 | 7/2011 | Rane et al. |
| 2011/0225037 A1 | 9/2011 | Tunca et al. |
| 2011/0230114 A1* | 9/2011 | Du Preez ............... A63H 3/28 446/175 |
| 2011/0246309 A1 | 10/2011 | Shkedi |
| 2011/0264497 A1 | 10/2011 | Clyne |
| 2011/0264567 A1 | 10/2011 | Clyne |
| 2012/0054189 A1 | 3/2012 | Moonka et al. |
| 2012/0066062 A1 | 3/2012 | Yoder et al. |
| 2012/0066064 A1 | 3/2012 | Yoder et al. |
| 2012/0179543 A1 | 7/2012 | Luo et al. |
| 2012/0185349 A1 | 7/2012 | Soroca et al. |
| 2012/0232960 A1 | 9/2012 | Smith |
| 2012/0233206 A1 | 9/2012 | Peterson et al. |
| 2012/0239479 A1 | 9/2012 | Amaro et al. |
| 2012/0271748 A1 | 10/2012 | DiSalvo |
| 2012/0284317 A1 | 11/2012 | Dalton |
| 2012/0323674 A1 | 12/2012 | Simmons et al. |
| 2012/0323954 A1* | 12/2012 | Bonalle ............... G06F 17/30592 707/769 |
| 2013/0066771 A1 | 3/2013 | Ciurea et al. |
| 2013/0073366 A1 | 3/2013 | Heath |
| 2013/0191213 A1 | 7/2013 | Beck et al. |
| 2013/0212041 A1 | 8/2013 | Feldman et al. |
| 2013/0275178 A1 | 10/2013 | Flake et al. |
| 2014/0101685 A1 | 4/2014 | Kitts et al. |
| 2014/0129499 A1 | 5/2014 | Hawkins |
| 2014/0149273 A1 | 5/2014 | Angell et al. |
| 2014/0229351 A1 | 8/2014 | Lutnick et al. |
| 2014/0278762 A1 | 9/2014 | Noyes |
| 2014/0278763 A1 | 9/2014 | Noyes |
| 2014/0278764 A1 | 9/2014 | Noyes |
| 2014/0278776 A1 | 9/2014 | Noyes et al. |
| 2015/0095145 A1 | 4/2015 | Shulman et al. |
| 2015/0121066 A1 | 4/2015 | Nix |
| 2015/0178744 A1 | 6/2015 | Noyes |
| 2015/0199699 A1 | 7/2015 | Milton et al. |
| 2015/0213465 A1 | 7/2015 | Noyes et al. |
| 2015/0222604 A1 | 8/2015 | Ylonen |
| 2016/0055129 A1 | 2/2016 | Kan et al. |
| 2017/0076109 A1 | 3/2017 | Kaditz et al. |
| 2017/0148048 A1 | 5/2017 | Cook et al. |
| 2017/0207916 A1 | 7/2017 | Luce et al. |
| 2017/0302696 A1 | 10/2017 | Schutz et al. |
| 2018/0040009 A1 | 2/2018 | Noyes |
| 2018/0096365 A1 | 4/2018 | Noyes et al. |
| 2018/0096417 A1 | 4/2018 | Cook et al. |

OTHER PUBLICATIONS

Real-Time Ad Targeting (Published online on Apr. 26, 2016 on https://www.quantcast.com/blog/real-time-ad-targeting-scalingquantcast-advertisng-to-100-million-machine-learning-predictions-per-second/).

* cited by examiner

METHODS AND SYSTEMS FOR SIGNALS MANAGEMENT

CROSS REFERENCE TO RELATED APPLICATIONS

This application claims the benefit of U.S. Provisional Application No. 61/791,297, filed Mar. 15, 2013, which is incorporated herein by reference in its entirety.

BACKGROUND OF THE INVENTION

1. Field of the Invention

The present invention relates to methods and systems for providing management for distributed signals or indicators by signal sellers for distribution and sale to signal buyers, for use toward advertising or other objectives.

2. Description of the Prior Art

Generally, it is known in the prior art to provide market signals as information passed between participants in a market. Examples of relevant art documents include the following:

U.S. Patent Application Publication No. 2011/0178845 for "System and Method for Matching Merchants to a Population of Consumers" by inventors Rane, et al., filed Jan. 20, 2010, describes a process of data analysis for the purpose of improving targeted advertising and analytics of data, with the major focus on drawing useful inferences for various entities from aggregated data, wherein entities are not limited to businesses and may include government agencies (census, polling data, etc.).

U.S. Patent Application Publication No. 2012/0233206 for "Methods and Systems for Electronic Data Exchange Utilizing Centralized Management Technology" by inventors Peterson, et al., filed May 24, 2012, describes an exchange of data among business entities and the process of disclosing/receiving data and a central management system for companies engaged in strategic partnership or alliance, whereas Patent 1 deals with a market place dynamic rather than a data exchange within a locked-in partnership management.

U.S. Patent Application Publication No. 2012/0066062 for "Systems and Methods to Present Triggers for Real-Time Offers" by inventors Yoder, et al., filed Aug. 8, 2011, describes collecting consumer transaction data for the benefit of targeted advertisements and an auctioning process (auction engine) for providing data clusters to clients. For example, cardholders may register in a program to receive offers, such as promotions, discounts, sweepstakes, reward points, direct mail coupons, email coupons, etc. The cardholders may register with issuers, or with the portal of the transaction handler. Based on the transaction data or transaction records and/or the registration data, the profile generator is to identify the clusters of cardholders and the values representing the affinity of the cardholders to the clusters. Various entities may place bids according to the clusters and/or the values to gain access to the cardholders, such as the user. For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

U.S. Patent Application Publication No. 2011/0246309 for "Method, stored program, and system for improving descriptive profiles" by inventor Shkedi, filed May 25, 2011, describes a process that enables entities to acquire databanks of user profiles that can add to existing knowledge of user profile data and the process is described as a transaction in that the entities disclose a set of profile information in exchange for additional, helpful data relevant to the disclosed data.

U.S. Patent Application Publication No. 2012/0323954 for "Systems and methods for cooperative data exchange" by inventors Bonalle, et al., filed Jun. 14, 2011, describes methods that enable business entities to gain greater, useful insights on their customers and build upon their relatively limited data via consumer data exchange, wherein upon sharing/merging/exchanging customer data, businesses can perform analysis to improve their business performance, and provides an example wherein original data may consist of a list of consumers, which can be enriched with the consumers' transaction history, search history, etc. via data exchange with other entities that own such information.

U.S. Patent Application Publication No. 2010/0262497 for "System and Methods for Controlling Bidding on Online Advertising Campaigns" by inventor Karlsson, filed Apr. 10, 2009, describes a system for managing bid prices of an online advertising campaign. The system includes a memory storing instructions for adjusting bid prices, and a campaign controller for generating a nominal bid price and a perturbation parameter, based on an ad request received from an advertiser. The system further includes an engine for generating a perturbed bid price based on the nominal bid price and the perturbation parameter, according to the instructions stored in the memory. The system further includes a serving unit for serving an ad impression based on the perturbed bid price. Also discloses that advertisers can bid on desired online ad delivery for their ad campaigns, describes management of the bidding process by managing and adjusting the bid price and describes systems and methods for a biddable multidimensional marketplace for advertising.

European Patent Application Publication No. 2063387 for "Systems and methods for a biddable multidimensional marketplace for advertising on a wireless communication device" by inventors Maggenti, et al., filed Mar. 31, 2008, describes providing targeted advertisements via mobile devices, and systems, methods and apparatus for a multidimensional bidding marketplace for providing advertising content to wireless devices. In particular, aspects allows advertising providers, to define and/or identify a one or more wireless device-based transient factors from a plurality of factors, which serve to define a targeted advertising audience and to bid on advertising based on the selected or identified transient factors.

European Patent Application No. 2076877 (also published as U.S. Patent Application Publication No. 2008/0103795) for "Lightweight and heavyweight interfaces to federated advertising marketplace" by inventors Biggs, et al., filed Oct. 18, 2007, describes a multi-party advertising exchange including advertising and publishing entities from different advertising networks, the invention provides architectures for an online advertising marketplace that range from lightweight to heavyweight implementations. A lightweight client side implementation of an interface includes centralized processing and storage of federated advertising marketplace data by centralized servers or services. A heavyweight client side implementation of an interface for advertising entities includes providing a peer instance of a federated advertising exchange application or set of processes is provided to each advertising entity as an interface for advertising entities where processing and storage are performed locally to each peer instance. Distributed advertising data can be replicated or synchronized with other peer instances.

U.S. Pat. No. 8,224,725 for "Escrowing digital property in a secure information vault" by inventors Grim, et al., filed Sep. 15, 2005, describes that data can be escrowed by receiving escrow parameters including a condition(s) for releasing the escrowed data, and an escrow recipient. An escrow contract is then created based upon the specified escrow parameters. The escrowing further includes storing the digital data in a secure information vault, and storing the escrow contract, along with a pointer to the stored data, in a database. When the condition has been satisfied, the data is released to the escrow recipient. The condition(s) for release can be a payment sum, a date, an indication from a depositor, a trustee or a vault administrator, and/or fulfillment of another escrow contract; also describes keeping data secure and releasing data to certain parties upon satisfaction of certain criteria.

U.S. Pat. No. 8,285,610 for "System and method of determining the quality of enhanced transaction data" by inventors Engle, et al., filed Mar. 26, 2009, describes "enhanced data", non-financial data beyond the primary transaction data and includes invoice level and line item details (for examples see background section) which is collected at the merchant and delivered to a financial service network.

U.S. Patent Application Publication No. 2011/0264497 for "Systems and Methods to Transfer Tax Credits" by inventor Clyne, filed Apr. 25, 2011, includes disclosure for a list of references describing acquiring consumer purchase data.

U.S. Patent Application Publication No. 2011/0264567 for "Systems and Methods to Provide Data Services" by inventor Clyne, filed Apr. 25, 2011, describes providing access to data of diverse sources in general, and more particularly, transaction data, such as records of payment made via credit cards, debit cards, prepaid cards, etc., and/or information based on or relevant to the transaction data; also describes that transaction data can be used for various purposes and that transaction data or information derived from transaction data may be provided to third parties.

U.S. Patent Application Publication No. 2012/0066064 for "Systems and Methods to Provide Real-Time Offers via a Cooperative Database" by inventors Yoder, et al., filed Sep. 2, 2011, describes a computing apparatus is configured to: store transaction data recording transactions processed by a transaction handler; organize third party data according to community, where the third party data includes first data received from a first plurality of entities of a first community and second data received from a second plurality of entities of a second community; and responsive to a request from a merchant in the second community, present an offer of the merchant in the second community to users identified via the transaction data and the first data received from the first plurality of entities of the first community. In one embodiment, the first data provides permission from the merchant in the first community to allow the merchant in the second community to use intelligence information of the first community to identify users for targeting offers from the merchant in the second community.

U.S. Patent Application Publication No. 2012/0054189 for "User List Identification" by inventors Moonka, et al., filed Aug. 30, 2011, describes systems, methods, computer program products are provided for presenting content. An example computer implemented method includes identifying, by a data exchange engine executing on one or more processors, one or more user lists based on owned or permissioned data, each user list including a unique identifier; associating metadata with each user list including data describing a category for the user list, population data describing statistical or inferred data concerning a list or members in a given user list and subscription data including data concerning use of a given user list; storing in a searchable database a user list identifier and the associated metadata; and publishing for potential subscribers a list of the user lists including providing an interface that includes for each user list the unique identifier and the associated metadata.

U.S. Pat. No. 5,850,900 for "Full service secure commercial electronic marketplace" by inventors Hare. et A, filed Jun. 19, 2000, describes an electronic marketplace, and in particular to a full service secure commercial electronic marketplace which generically organizes, stores, updates, and distributes product information from a plurality of suppliers to facilitate multiple levels of sourcing, including contract and off-contract purchasing between the suppliers and a plurality of buyers.

None of the prior art references discloses the systems and methods of the present invention managing signals by signal owners or signal sellers, either in their interactions directly with signal buyers and/or within a signals marketplace for value-based exchange of signals information between buyers and sellers, while ensuring protection of the underlying data represented by the signals; or pricing data signals based upon value derived from the use of data signals as observed from consumer behavior; or for maintaining data in a federated model in control of the data owner; or for allowing signal owners to set rules and parameters for the release of information to approved buyers; or for consumers to permission use of signals and other data taken by third parties through observations. Thus, the creation and management of signals by signal owners is important for providing secure, private and controlled release of information for value that is determined by a structured and rules-based management for signals.

SUMMARY OF THE INVENTION

The present invention relates to methods and systems for managing signals or indicators by signal sellers for distribution and sale to signal buyers.

The distributed signals are constructed by signal sellers by transforming raw data into signals or indicators, which facilitate buying and selling distributed information through these signals or indicators without disclosing the underlying data. The signals are derived from data sources and abstracted to protect the underlying data. Signals are constructed in such a way that they protect the underlying data, but have consistency and relevance toward a given objective. Signal owners or sellers first convert data into a "signal" or indicator, the construction of the signal is in the control of the data owner, different signal constructs will have relevance toward different objectives and signal buyers. The signal or indicator construct allows the signal seller to abstract the underlying data without being or disclosing the actual data itself, i.e., the signal functions like metadata. The economic value of the signal depends on the price each buyer is willing to pay, which depends on the value that the signal has toward a given objective. The virtual marketplace brings buyers and sellers of signals together and communicates the history of signal effectiveness for each objective. Sellers of signals define rules governing how to sell signals directly to buyers and/or based upon virtual marketplace historical data, buyer, agreements, price, effectiveness, consumer permissions and other rules. Buyers have the opportunity to bid for information within the rules of the marketplace and the rules of the seller. Signals (or indicators of data that do not disclose the data), and the associated virtual marketplace facilitate the discovery of signals for a use, pricing of signals for a defined use, the creation of agreements for use, the regulatory and consumer permission of use, the transmission and tracking during use, the value created after the use, and for the clearing and settlement based upon observations after the use and under the terms of the agreement.

It is an aspect of this invention to provide methods and systems for managing signals that are controlled by their corresponding signal sellers or signal owners. Still another aspect of the invention is to provide signals management by signal owners or sellers in a virtual marketplace by which a prospective buyers can purchase these distributed signals, which includes a mechanism for both the buyers and the sellers to create agreements, exchange information within the terms of agreement, ensure regulatory and consumer approval of use, track the performance of the usage, and settle under the terms of the agreement and the observed use.

These and other aspects of the present invention will become apparent to those skilled in the art after a reading of the following description of the preferred embodiment when considered with the drawings, as they support the claimed invention.

DETAILED DESCRIPTION

Figure 1:
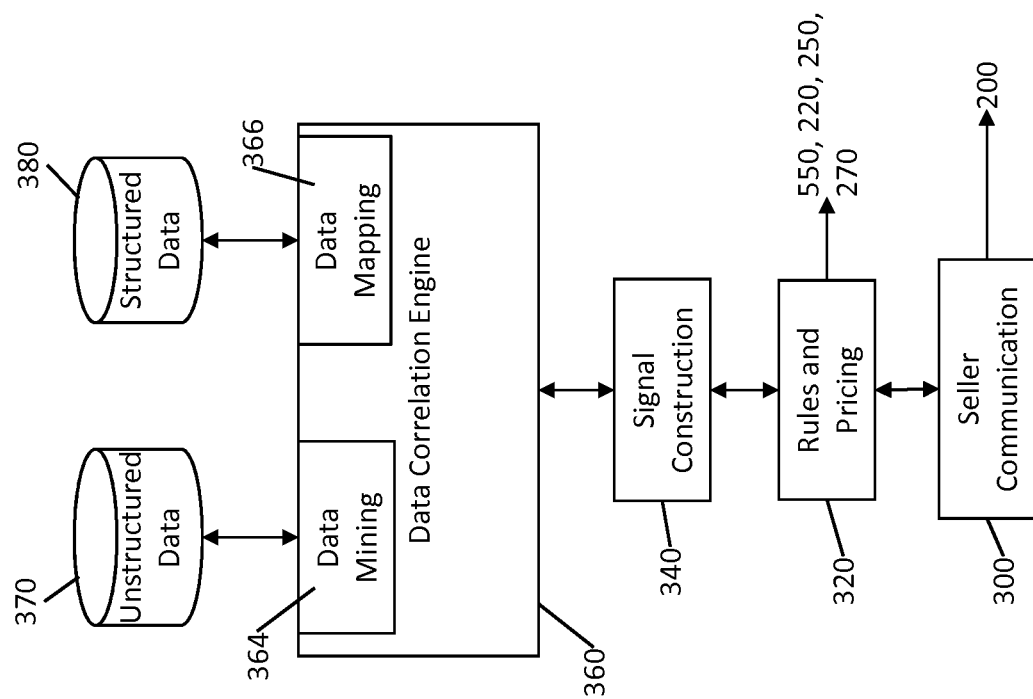
FIG. 1 is a flow diagram of an embodiment of the invention.

Referring now to the drawings in general, the illustrations are for the purpose of describing a preferred embodiment of the invention and are not intended to limit the invention thereto.

The present invention provides methods and systems for using, buying and selling distributed data using signals or indicators that represent the data without disclosing the data, and the signal owner managing its proprietary signals. By way of background, creators of signals are the sellers of information. The content of a seller's information based upon an historical interaction with one or more events, objects or activities that correspond to the behavior of a multitude of objects. Sellers of data or information have multiple requests to share their information. Signals or indicators are a mechanism to share derived information without disclosing the raw data. The value of any asset is highly correlated to the price that buyers are willing to pay.

There is a longstanding and unmet need for providing signal management by signal creators (also the signal sellers and/or signal owners) who selectively provide information of interest to signal buyers for defined uses, while protecting the underlying data and maintaining the control of the signal seller through its usage within a network-based, distributed data exchange where economic value of the data, as derived from its use, is the central pricing mechanism within agreements between the sellers and buyers. Nothing in infinite supply can have a price. Data may theoretically have an infinite value, but once it is shared, further dissemination is hard to prevent, thus the value of data quickly diminishes once it is shared. It is an objective of the Signals Exchange Marketplace to create a market for data within a signal or indicator framework, which protects the underlying data that the signals or indicators represent. This signals metaphor allows each signal or indicator provider/owner/seller the ability to construct, control and price their signals and protect further dissemination of both the signals, as well as the underlying data.

The present invention provides a method for managing signals by corresponding signal owners in a virtualized or cloud-based computing system wherein the method steps include: providing a signal index associated with at least one signal corresponding to a behavior of an object and/or an activity and/or an event, wherein the signal index includes a proposed signal value for a predetermined signal use, and wherein the signal index is stored in a memory of a signal owner computer that is constructed and configured for network-based communication with a remote server computer; transmitting the signal index to the remote server computer, which is accessible by distributed signal buyers via the network; delivering signals to the signal buyers; tracking the signals; and monitoring use of the signals for the predetermined signal use by the signal buyers.

Additional steps may include the following: providing a feedback corresponding to the use of the signal, wherein the feedback includes object behavior, or activity, economic measurements, and/or event measurements; automatically adjusting the correlation of the signal(s) based on the feedback; updating the signal index to include the feedback; receiving information from signal buyers confirming receipt of signal, and compliance with the predetermined signal use; automatically correlating the indexed signals to requests of distributed signal buyers.

From the beginning, the signal owner controls how the at least one signal is created, generated and/or constructed; however, for most signals, the at least one signal includes information about object state, activity, behavior recency, behavior frequency, and behavior affinity; and further includes a signal type selected from the group consisting of: state signals, event signals, activity signals, behavior signals, relational signals, location signals, loyalty signals, purchase signals, social signals, and combinations thereof. Significantly, the signal owner has further steps in managing its signals, including: retaining control of signal data within a defined use of the signal by a registered buyer; selectively sharing information with buyers; defining use and an agreement to report on a result of use with a registered buyer or counterparty; releasing signal data to a registered buyer based upon the agreement; monitoring performance of the at least one signal compared with a corresponding objective; generating a unique identifier associated with each signal owner for exchange with the signal buyers; the signal owner limiting signal availability to signal buyers and/or to a signal marketplace based upon a rules engine that enforces limitations by any party in a transaction for the signal(s), wherein the rules engine includes rules regarding: buyer identity, campaign type, signal requested, price, redemption signal type, purchase quantity, past performance of signal, past performance of campaign type, past performance of buyer, and combinations thereof; linking the indexed signals to relational databases; and each signal owner tracking agreements for buying and selling signals.

For the signal owner's management of the signals, preferably each of the signals is indexed in the centralized database based upon ownership, object relevance, behavior relevance, historical usage, performance, and correlation to other signals and data, wherein the value is automatically generated by a remote server computer associated with the remote database, based upon at least two factors associated with the value, and wherein the value includes relevance to a signal buyer and a buyer objective. By way of example and not limitation, the relevance to the signal buyer is based upon at least one objective, with the economic value of the signal based upon the measured performance of at least one signal toward at least one objective by the buyer. Preferably, the at least two factors used for generating a signal value are selected from: predictive accuracy, fidelity, relevance to an objective, near-real-timeliness, frequency, recency, state of an object, relationship of the source of the signal, reputation of the signal, reputation of the seller, affinity to a target, and/or usefulness to an objective. By way of example and not limitation, the relevance of a signal to the signal buyer based upon at least one objective may include marketing and/or advertising. In a non-advertising use, the exchange of data within the data marketplace can also take place between a buyer and a seller, without the participation of other entities such as a publisher, retailer or consumer. For example, a farmer has created data on the average yield of corn per acre during the harvesting of the corn crop. The farmer also has data on the type of corn seed used in the field, and the precipitation (total rainfall) on each acre he manages. A signal buyer seeks the average yield of that farmer's seed by acre, by precipitation. The farmer will sell the data through a signal agreement. The signal agreement will specify the terms by which the signal can be used, price, time, retention and other terms necessary.

The methods for signal management by the signal owner may further include additional steps including: aggregating the signals; creating a new signal or a synthetic signal from one or more signals from at least one source; linking the indexed signals to relational databases, wherein the signals are locally indexed by each signal owner and/or each seller associated with the signals; the virtual marketplace server computer and/or the owners creating and tracking their corresponding indexed signals; updating the remote and centralized indices of signals; and/or tracking agreements for buying and selling signals.

In another embodiment of a method for managing signals by signal owners, the method steps include: constructing at least one signal and saving the signal(s) to a signal owner computer, wherein the signal owner controls how the at least one signal is created, generated and/or constructed and how the at least one signal is used by the buyer; generating a signal index and listing the index in a centralized database; generating a signal value based upon at least two factors associated with each value, the at least two factors selected from the group consisting of: predictive accuracy, fidelity, relevance to an objective, near-real-timeliness, frequency, recency, relationship of the source of the signal, reputation of the signal, reputation of the seller, affinity to a target, usefulness to an objective, and combinations thereof.

Additional steps may further include: automatically updating the listed index and/or creating new listings; receiving a defined use and an agreement to report on a result of use by a registered buyer with the signal owner computer; releasing signal data to a registered buyer based upon the agreement between the signal owner and the registered buyer; monitoring performance of the at least one signal compared with a corresponding objective; the signal seller providing each of the signals with a unique identifier associated with each signal owner/seller for exchange with a buyer via the marketplace; automatically determining a relevance to an objective for the at least one signal based on comparison with consumer feedback and consumer behavior; limiting signal availability based upon a rules engine that automatically considers buyer identity, campaign type, signal requested, price, redemption signal type, purchase quantity, past performance of signal, past performance of campaign type, past performance of buyer, and combinations thereof automatically correlating how the value of the information decays over time and with respect to relevance to the objective; generating a value of signal relevance to the objective based upon consumer feedback, buyer behavior, and/or consumer reputation; receiving feedback from the buyer regarding qualities of relevance, correlation, and/or strength of the at least one signal; and/or receiving inputs from third party observers that inform the efficacy of signal use and correlation across a multitude of participants and multitude of signal uses.

The present invention system for managing signals by corresponding signal owners in a virtualized or cloud-based computing environment includes the following components and their relationships: a remote server computer constructed and configured for network-based communication with at least one signal owner computer and at least one signal buyer computer; at least one signal associated with a behavior or state of an object and/or an activity and/or an event; a signal index associated with the at least one signal, which is stored in a memory of the signal owner computer; and a proposed signal value for a predetermined signal use corresponding to the at least one signal, thereby delivering signals to the signal buyers, tracking the signals, and monitoring use of the signals for the predetermined signal use by the signal buyers. Additionally, the signals are indexed, abstracted and/or anonymized from their data source to protect the identity of the signal owner. Also, preferably, the remote server computer is constructed and configured to receive inputs via a communications network from third party observers that inform the efficacy of signal use and correlation across a multitude of participants and multitude of signal uses.

In another embodiment of systems for managing signals by signal owners includes engagement or interaction with a signals marketplace in a virtualized computer network for generating signals from distributed data sources controlled by a multiplicity of owners and further includes at least the following components and their relationships with each other: a remote server computer constructed and configured in network-based communication with a centralized database further comprising at least one index for signals data, and operable to automatically generate an assigned value corresponding to each unique signal created by a signal seller within a remote index of signals data; wherein the remote indexed signals data are generated from remote structured and unstructured data. receiving at least one signal from a first data source and at least one signal from a second data source, wherein the marketplace registers remote signals, which originate from different distributed data sources controlled by different owners into a centralized database or signals index; wherein each of the registered signals has a corresponding assigned value stored in the central database and associated with its indexed corresponding remote signal; and, wherein each assigned value is based on at least two factors is dependent upon a signal source value and a buyer objective. Preferably, the signals marketplace system automatically recommends signals, and the price for a given usage for both signal buyers signal sellers or signal owners. Additionally or alternatively, the recommended pricing is automatically generated based upon a number of factors, including relevance to an objective, fidelity, near-real-timeliness or recency, affinity, predictive accuracy, and combinations thereof, and/or is negotiated in a bid-response exchange between the owners and buyers.

In the virtual marketplace, purchases of the owners' signals are tracked by the owners or sellers, within the remote server computer, and in the signals marketplace, which automatically tracks the signals data through its function of transferring signal information between buyer and seller within active agreements, and monitoring feedback on signal performance through observation of events, behaviors, environment and states of objects and objectives. The marketplace uses this feedback to update directories, indices, pricing, history, agreements, and correlations to an objective. Also preferably, the signals marketplace centralized server computer automatically tracks and manages signal and participant reputation for communication to other marketplace participants. The signals and their corresponding owners, as well as buyers, brokers, publishers, observers and other participants are registered and registration information is stored in the centralized database associated with the virtual marketplace remote server computer, and the registration information is stored in a shared directory associated with the centralized database.

The present invention also provides an embodiment including a method for creating and using a virtual marketplace for valuing and selling signals generated from distributed data sources that are controlled by a multiplicity of owners, the method steps including: providing at least one signal from a first data source and at least one signal from a second data source to a remote server computer for a signal marketplace or exchange; wherein the signals originate from different distributed data sources controlled by different owners and the signals are indexed and listed in a centralized database and each of the indexed signals is linked to corresponding relational databases; and, wherein a value for each centralized indexed signal is automatically generated by the remote server computer associated with the seller where terms of use have been agreed. The value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof. Also, in this method embodiment, as with the systems of the present invention, the marketplace provides for participation and compensation of other parties that observe object behavior, object state or are otherwise capable of providing feedback signals corresponding to a state, behavior, activity, and/or an event. This observer feedback informs the agreements, economic value of the signals, object preferences, calculated correlation of signal information, environmental projections and other marketplace functions. The economic value of the observation can be calculated by the marketplace, and these observation feedback signals can be indexed and purchased within the marketplace. Advantageously, the listed index provides for automated matching with buyer candidates having corresponding objectives for buying signals and signals data, and wherein the objectives include consumer state, events and behavior(s). Additional method steps include: the step of automatically updating the listed index and/or creating new listings; receiving a defined use and an agreement to report on a result of use by a registered buyer with the server computer; releasing signal data to a registered buyer based upon the agreement between the signal owner and the registered buyer; monitoring performance of the at least one signal compared with a corresponding objective; automatically determining a relevance to an objective for the at least one signal based on comparison with consumer feedback and consumer behavior; and/or limiting signal availability based upon a rules engine that automatically considers buyer agreement, identity, campaign type, signal requested, price, redemption signal type, purchase quantity, past performance of signal, past performance of campaign type, past performance of buyer; automatically correlating how the value of the information decays over time and with respect to relevance to the objective; and combinations thereof.

According to the present invention, the signal owner controls how the at least one signal is created, generated and/or constructed and how the at least one signal is used by the buyer, although for facilitating the virtual marketplace or exchange between signal sellers and signal buyers, preferably the at least one signal includes a signal type selected from the group consisting of: event signals, activity signals, behavior signals, performance signals, relational signals, location signals, loyalty signals, purchase signals, social signals, and combinations thereof.

Methods of the present invention further include the step of generating a value of signal relevance to the objective based upon consumer feedback, buyer behavior, and/or consumer reputation; and, more particularly, wherein the value of the at least one signal depends upon the time of the at least one signal from an event occurrence, and wherein the value of the at least one signal decays over time. Also, the methods include the step of automatically correlating how the value of the information decays over time and with respect to relevance to the objective.

Preferably, the virtual marketplace or exchange server computer receives feedback from the buyers and observers regarding qualities of relevance, correlation, and/or strength of each of the at least one signal. In preferred embodiments of the present invention, a signal quality and a signal reputation are automatically generated by the virtual marketplace based upon an assessment of signal performance compared with an objective and/or based on the feedback received.

The present invention including signals management within the context of a virtual data marketplace for signals is built on the framework of creating signals or indicators by their corresponding signal owners or signal sellers, the method steps performed by a signal owner include: constructing at least one signal associated with a behavior of an object and/or an activity and/or an event associated with the object in a signal owner computer that is constructed and configured for network-based communication with a remote server computer, wherein the at least one signal based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, state, activity, and/or the event. Additional steps include indexing the at least one signal; listing the indexed signals in a remote database associated with the remote server computer; communicating the remote index signal to the centralized data marketplace signal index, wherein the centralized signal index listing provides for automated matching with buyer candidates having corresponding objectives for buying signals and signals data, wherein the objectives include consumer behavior(s); and updating the listing of the indexed signals by the signal seller or signal owner.

The at least one signal includes a signal type selected from the group consisting of: event signals, activity signals, behavior signals, relational signals, location signals, loyalty signals, purchase signals, social signals, and combinations thereof. Signals are generated or constructed from both structured and unstructured data. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data and unstructured data by a correlation engine. In constructing the at least one signal or indicator, preferably the signal seller (or its system and seller correlation engine) automatically determines a relevance to an objective from historical performance and including external observations and feedback on object state, activity or behavior.

While the definition and construction of the signal is at the discretion of the Seller, generally signals conform to a common signal structure whose elements are named and formatted to marketplace conventions for the purpose of creating a common taxonomy for exchange of signal information. In the case of a signal exchange within a signals marketplace, but also for exchange outside of a marketplace, the signal structure provides for secure and reliable transportation and translation of an information payload contained with a signal. The signal construct defines the source, the destination, the delivery channel, the method for securing the data, the agreement under which the data is exchanged, a transaction identifier, a transaction time, information necessary to confirm receipt, template which describes the message type, and the payload of the message. Sellers and buyers use the signals construct to create, register, publish, discover, assess, sell, manage, and measure data exchange according to the systems and methods of the present invention. Signal types include both buyer-initiated and seller-initiated signals; some examples follow for illustration purposes, but are not intended to limit the claimed invention thereto.

Buyer Initiated Behavior Signal (BIBS). Behavior signals are published by sellers which observe object behavior. For a given buyer initiated behavior signal, the buyer of a behavior signal requests behavior signal from seller for a given event, object or category of objects. The content of the seller's signal is based upon an historical interaction with one or more events, objects or activities that correspond to the behavior of an object. To obtain the seller's signal, the buyer must provide a reference point for the seller to create the behavior signal. In this model it is the request of the buyer triggers the exchange of data. For a given reference point, the seller's signal describes a behavior such and such information as the recency and the frequency of the behavior. By way of example and not limitation, a behavior name is illustrated by "Travel-To [Variable]". The buyer initiates the request and seeds the reference point variable for the signal. Each buyer could pay a different price depending on the value they derive from the signal.

Buyer Initiated Event Signal (BIES). Event signals are published by sellers which observe events. For a given buyer initiated event signal, the buyer of an event signal requests objects, or categories of objects from seller that have a relationship to a given event. The content of the seller's signal is based upon an historical interaction with one or more events, objects or activities that correspond to an event. To obtain the seller's signal, the buyer must provide a reference point for the seller to create the event signal. In this model it is the request of the buyer triggers the exchange of data. A signal request is initiated by the buyer asking the seller if a given reference event has occurred. The signal response can contain information on the event, objects within the event, recency, frequency, location, as well as specifics surrounding the event. By way of example and not limitation, consider "movie purchases in Cincinnati Ohio in last five minutes" as a signal request of this type. Each buyer could pay a different price depending on the value they derive from the signal.

Seller Initiated Behavior Signal (SIBS). In this case the seller is initiating (or publishing) that a behavior has occurred. The content of the seller's signal is based upon a current or historical interaction with one or more events, objects or activities which correspond to the behavior of an object. The signals can be published to one or more buyers, and prospective buyers as the activity occurs. Each buyer could pay a different price depending on the value they derive from the signal. By way of example and not limitation, consider "consumer [CONSUMER_NAME] is shopping in [Location]" as a signal.

Seller Initiated Event Signal (SIES). Seller is publishing an event to one or more buyers. The content of the seller's signal is based upon a current or historical interaction with one or more events, objects or activities, which correspond to the behavior of an object. From a software design perspective, this model is consistent with software based publish/subscribe paradigm. Within commerce signals buyers "subscribe" to an event made known by the seller. Each buyer could pay a different price depending on the value they derive from the signal. The seller initiates the signal, and can communicate specifics about the event. By way of example and not limitation, consider "consumer [CONSUMER_NAME] purchased movie ticket" as a signal.

The signals may be directly derived, constructed, or generated from signal owner raw data and/or synthetic signals may be constructed from at least one signal or a multiplicity of signals, i.e., one or more signals are used to construct additional signals, so the synthetic signals are not directly associated with the underlying raw data. Once again, signals or indicators according to the present invention are generated or constructed from both structured and unstructured data of the signal owner. Similarly, a consensus signal or a generalized signal from one or more signals. Note that the method steps of the present invention are made for a multiplicity of signals and corresponding signal owners, in particular in the case of distribution in the context of a virtual marketplace or exchange for signals.

Preferably, after constructing signals, their distribution or sale to buyers is controlled by the signal owner and rules governing seller signals or owner signals that provide for limiting signal availability based upon a rules engine that automatically considers buyer identity, campaign type, signal requested, price, redemption signal type, purchase quantity, past performance of signal, past performance of campaign type, past performance of buyer, and combinations thereof. The rules engine resides within a remote computer of the signal seller and is communicated through a distributed network, either directly and/or within a virtual marketplace having a centralized rules engine governing the management of the exchange of signals for a multiplicity of signal sellers and signal buyers.

Signal value cannot be established conclusively independently of a signal buyer's objective. Additionally the value of any of the signals depends upon signal relevance to the objective based upon a multiplicity of factors, including feedback such as time from last observation and/or interaction, effectiveness of consumer interaction, depth of interaction, consumer feedback, buyer behavior, and/or consumer reputation. The signal seller correlation engines provide options for automatically correlating how the signals or indicators relate to data held within the signal seller to data external to the signal seller. The present invention also provides an embodiment including a method for adjusting the correlation of data with time and with respect to relevance to the objective(s) of buyers. Significantly, regardless of the objectives, generally the value of the signal(s) depends upon the time of the signal construction from an event occurrence, wherein the value of the signal decays over time. Also, the present invention provides for the economic value of the signal to decay over time. By way of example and not limitation, consider a signal "Consumer [ID] Purchased Movie Ticket at TIME". This signal has relevance to a buyer's objective, which is dependent on time since the observation. In other words a signal has a higher relevance if it is one second old, and a lesser relevance as time progresses. The economic value of a signal is in proportion to its relevance, hence the value of the signal is also higher if the signal is one second old, and a lesser value as time progresses.

Feedback is a form of signal sourced from observers of objects. Observers typically have no need to maintain historical information, but rather report on current object state or activity. By way of example and not limitation, consider a Wi-Fi hotspot at LOCATION that has a current request for access from COMPUTER_ID. If the objective of a signal buyer was for COMPUTER_ID presence at LOCATION, then this observation is relevant to the buyer. Furthermore, the process of receiving feedback from observers, pertaining to object state, activity, performance and behavior, provides a mechanism to assess and adjust performance of marketplace participants, marketplace systems, signals and campaigns operating within a federated data marketplace. And so evolving the at least one signal based upon the feedback received is an additional step in methods of the present invention. Additionally, a signal quality and a signal reputation is automatically generated (by the correlation engine of the signal seller and/or by the signal marketplace or signal exchange) based upon an assessment of signal feedback. The signal feedback may provide information useful for evaluating performance of the signal compared with the buyer's objectives; the virtual marketplace will determine what feedback is relevant toward any objective. By way of example, a correlation engine is described within U.S. Pat. No. 5,504,839 for "Processor and processing element for use in a neural network" by inventor Mobus, filed Aug. 29, 1994, which is incorporated herein by reference in its entirety.

The present invention provides methods for creating signals or indicators by corresponding signal owners, the method steps performed by a signal owner includes: constructing at least one signal associated with a behavior of an object and/or an activity and/or an event associated with the object in a signal owner computer that is constructed and configured for network-based communication with a remote server computer, wherein the value of the signals is controlled by the seller and based upon at least two factors associated with each value, the at least two factors selected from the group consisting of: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof; generating a first value for each of the at least one signal; and tracking usage of the at least one signal. Also, the at least one signal provides a feedback corresponding to the behavior, activity, and/or the event. Additional steps include indexing the at least one signal; listing the indexed signals in a remote database associated with the remote server computer, communicating the remote index to the centralized data marketplace signal index, wherein the centralized signal index listing provides for automated matching with buyer candidates having corresponding objectives for buying signals and signals data, wherein the objectives include consumer behavior(s), events, object states, object performance; and updating the listing of the remote and centralized indices by the signal seller or signal owner.

The content of the seller's signal is based upon the seller's interaction with one or more events, objects or activities. Signals are generated or constructed from both structured and unstructured data, which contain records of interaction. Significantly, each signal owner controls how the at least one signal is created, generated and/or constructed; in embodiments of the present invention, methods of the present invention provide steps wherein signals or indicators are created by the signal owner transforming its own data into the signals or indicators through steps of automatically organizing structured data and unstructured data by a correlation engine. While the definition and construction of the signal is at the discretion of the Seller, generally signals conform to a common signal structure whose elements are named and formatted to marketplace conventions for the purpose of creating a common taxonomy for publishing, discover and exchange of signal information. By way of example and not limitation, the taxonomy of the at least one signal includes a signal type selected from the group consisting of: state signals, event signals, activity signals, behavior signals, relational signals, location signals, loyalty signals, purchase signals, social signals, and combinations thereof.

The present invention provides for the signal owner selectively sharing signals information with signal buyers in a virtual marketplace or exchange, wherein the signals information includes a unique identifier associating each signal transmitted by an owner and/or signal seller for exchange with a signal buyer and/or signal data marketplace and agreement within which the data exchange was governed. Preferably, the information shared provides privacy protection for the signal owner. Furthermore, each signal includes and defines the source, the destination, the delivery channel, the method for securing the data, the agreement under which the data is exchanged, a transaction identifier, a transaction time, information necessary to confirm receipt, template which describes the message type, and the payload of the message. In any case, the signals or indicators constructed by the signal seller (signal owner) provide the seller with a mechanism to protect the underlying data from which the signals or indicators are derived. Also, in preferred embodiments, additional privacy protection may be provided by at least one of: screening, anonymizing, and/or using hashed values. For example with hashed values, methods provide for matching credit card objects with MD5 hash of a credit card number allowing signal sellers to identify behavior on the match of hash values versus the match of actual credit card numbers; importantly the MD5 hash cannot be easily reversed (except by NSA). Both entities or parties to the transaction are doing consistent hash, but neither one disclose a number. The same methods and systems are used with email hash; it confirms the match, but only discloses the encrypted information.

Systems and methods of the present invention provide for releasing signal data to a registered buyer based upon an agreement between the signal owner and the registered buyer. Before an agreement is generated, the signal seller retains control of the signal data until after receiving a defined use by a registered buyer, which provides one of the key terms for the agreement. Preferably, the agreement also provides requirements for feedback and/or measurement of objective, such as by way of example and not limitation, to report on a result of use by a registered buyer. Also, the release of the signal data is can be either based upon an observance by the seller or by a request of the buyer. In another embodiment, the release of signal data is based upon a trigger. Preferably, the release of signal data or signals to registered buyer(s) is automatic based upon detection of the trigger.

The systems and methods of the present invention for signals management also provide for automatically confirming receipt of the at least one signal by a destination or signal buyer(s); this step is achieved by automated messaging generated from the buyer computer and communicated automatically through the network to the seller computer directly and/or to the signal marketplace server computer for tracking of all signals distribution based upon unique signal identifiers and the agreements between signal sellers and signal buyers for predetermined uses of the signals.

As set forth in the foregoing, the construction of signals is provided for use between signal sellers and signal buyers via the virtual marketplace through a network for communication between their distributed computers and a remote server computer associated with the virtual marketplace for signals data. The present invention further provides methods and systems for establishing and using a virtual marketplace for value-based exchange of those constructed signals, wherein the value of the signals is determined in the context of willing signal buyers and signal sellers for the signals. The signals of the present invention are derived from data sources that are owned by a multiplicity of entities and/or individuals, and the signals are abstracted from distributed information and data associated with the multiplicity of entities and/or individuals to protect the underlying information and data. Each entity or individual that sells signals data in the virtual marketplace first converts or transforms their unique raw data (or underlying data) into a "signal" or signals, which are indicators associated with object behavior as observed by their respective owners. The value of any signal cannot be determined separate from one or more buyers, their objectives, and the corresponding use of the signals toward those objectives. Signal sellers create and define rules in which to sell signals. Rules can be based upon requestor, usage, object, behavior, performance, reputation or any other attribute available in the market. By way of example and not limitation, Barclays Bank will only allow consumer travel signals to be used by approved vendors and with explicit consumer permission for hotel reservation use. Buyers have the opportunity to request access to signals within the rules of the marketplace seller, consumer and other regulatory authority. Sellers may choose to accept requests within the terms of an agreement, which is maintained in the marketplace or directly between the 2 parties. In the case of a signals marketplace or exchange for the signals, the marketplace centralized server computer retains the information on the agreement, signal requests, signal exchanges, feedback, historical data, buyer, seller, seller reputation, signal reputation, price, effectiveness, rules, constraints, and combinations thereof.

According to the present invention, signal creators (signal sellers) or signal owners retain control of their respective data and the signals constructed therefrom, until a registered buyer defines use of the signals, agrees to report on result (by way of example and not limitation, reports on effectiveness for a given use) and other terms, and an agreement is created between buyer and seller. This method for creating and using signals or indicators establishes control, value, and price for those signals between the signal seller and signal buyer(s), and/or the signal sellers and signal buyers who are the participants in a virtual marketplace or signals exchange. The signal supplier or signal seller (or signal owner) controls how each signal is constructed or generated; the underlying data or information owned by the signal seller may be reconstructed or regenerated into more than one signal for use by third parties for different purposes. Marketplace rules govern construction, transmission and tracking of signal information and the associated object throughout their defined use; this allows signals to be correlated to object behavior. Tying signal performance to object behavior and object events subsequently provides for measurement of value and subsequent market based pricing of signals within the virtual marketplace. Object behavior may take the form of feedback from parties, which are external to any given agreement between buyer and seller. This object behavior obtained from external third party observers inform and correct the correlation of signals to objects and behavior within the marketplace. Importantly this correlation is external to information available to either buyer or seller independently. Third party observers thus participate in the marketplace to provide feedback on objects, which may be covered within a multitude of agreements between a multitude of sellers and buyers. Thus the present invention, provides for the interaction of third party observers across the entire marketplace participants. The signal construct defines the source, the destination, the delivery channel, the method for securing the data, the agreement under which the data is exchanged, a transaction identifier, a transaction time, information necessary to confirm receipt, template which describes the message type, and the payload of the message. The construction of a signal by a signal seller will have varying degrees of relevance to any given signal buyer and that buyer's objective, thus the value of the information and data, as well as the signals generated therefrom, will vary with its correlation and fidelity. This provides a natural feedback loop in the virtual marketplace or exchange. Signals that have poor fidelity or poor correlation with an objective will have poor performance, and thus a correspondingly poor price.

Signal sellers have minimal insight into prospective buyers, and the value of their signals in any given context. Visibility is further limited into competing data. For example, if an advertiser intends to sell hotels to frequent travelers of a predetermined destination, they have the choice of seeking information from flight records, geo location, rental car records, credit card issuers, etc., and combinations thereof. Buyers of information also have interests to optimize price for a given performance or quality of correlation. If a signal buyer could obtain geographic location information for $0.05 with a 70% correlation, it may well be a preferred purchase to flight records, which cost $5.00 and have a 100% correlation. Within a signals advertising application embodiment, the signal marketplace assumes the primary role in directing and optimizing the purchase of signals for targeted advertising, including campaigns across multiple prospective sources, to determine which signals (if any) have relevance to a given advertising campaign, and providing both buyers and sellers with a liquid market in which to exchange, and protect, information, while providing and purchasing use of the signals within the marketplace or exchange. Significantly, a category of signals that represents real time or near real time activity, events, states and behavior have values that decay quickly with time. In this instance a signal that represents an object's activity one second ago has a greater value than the same signal that is one hour old. The signals marketplace enables the transmission of these real time signals within the rules and constraints of the participants, consumers, marketplace and regulatory authorities.

Furthermore, the marketplace for signals includes a signals index for discovery, tracking and comparing signals and their historical value, reputation and performance. Categories or groups of signals by type, behavior, seller, and usage are also provided. By way of example and not limitation, signals include an expression of frequency and relevance toward an input variable (e.g., affinity to a city, type of food, automobiles, sports, etc.). Also, signals responses are based upon the object identifier which the seller uses internally to uniquely identify a given object. By way of example and not limitation, object identifiers include encrypted forms of e-mail address, phone number, location, loyalty card number, etc. Correlation between signals and their performance is represented by the signal pricing and trading (buying/selling) within the virtual marketplace, third party observers, and/or directly between signal sellers and signal buyers. Additionally, initial rating for expected correlation between signals and their performance is provided by the seller. A new signal will have no historical performance and thus buyers will likely minimize their purchase until the performance can be validated.

In the embodiment having a signals marketplace or exchange, the centralized server computer associated with the signals marketplace maintains a master directory of signals and associated correlations in order to facilitate automated signal seller to signal buyer matching. Historical performance of a signal, signal seller and third party observer information may be used to correlate between signals based upon buyer and usage. Additionally, initial rating for expected correlation between signals and their performance is provided by the seller. A new signal will have no historical performance and thus buyers may likely minimize their purchase or until the performance can be validated.

As illustrated in FIG. 1, the flow diagram indicates signal construction or generation method steps. As illustrated in the FIG. 1, the system provides data mining 364 on the unstructured data and data mapping 366 on the structured data. Signals are based on structured 380 and unstructured 370 data. The content of the seller's signal is based upon an historical interaction with one or more events, objects or activities that correspond to the behavior of an object. To obtain the seller's signal, the buyer must provide a reference point for the seller to create a signal. For example, a signal of AFFINITY_TO_CITY may require input of ID, and CITY_NAME. A plane, a phone, a consumer, a computer could all have an affinity to a city. Similarly a phone company, an airline, a rental car company, a bank, a search engine, a restaurant, or similar entity could all have a set of data that would inform the affinity toward a city. The signal seller has multiple options when constructing a signal of "AFFINITY_TO_CITY", sellers could use consumer billing records, flight records, payment records, location records, in sourcing data for to respond to this request. In order to protect consumer information, the signal seller may use any source of information in constructing a response and a signal response is typically normalized to be between 0 and 1, or otherwise created in a way to abstract the underlying data in a way that makes the signal relevant to a specific request. For example an airline may use flight information to determine that a consumer has traveled to NYC five times in the last year and has set AFFINITY_TO_CITY for New York equal to 0.5. The value of this information is completely dependent on its quantity, accuracy, recency, competing information sources, price and intended use. The marketplace 250 informs the rules and pricing engine 320 of relevant information to set price.

Signal sellers have control over how they sell their signals data within the rules engine 320. These rules can be constructed based on any marketplace attribute. For example, if United Airlines bought signals data within the signal marketplace, or directly from signals seller(s), and receives a response from a signals data seller that is a competing airline for a particular traveler, United Airlines could surmise the this particular traveler uses the competing airline for travel to that city and could thus directly market to the that consumer. In one embodiment of the present invention, the signals data seller rules engine 320 is within the control and ownership of the each signal seller. In this case, the marketplace data is not held centrally; significantly, raw data, signal construction, signal indexing, signal rules, and signal indexing are managed remotely across each data exchange participant. Each participant leverages a common taxonomy for constructing signals, which provides for remote discovery in remote indexes, or centrally when remote indexes are combined or transferred to the common centralized server computer for the signals market. Significantly, this federated model provides for control of the data by the owner, allowing the marketplace to establish linkage to federated data owners, with each data owner in control of rules and parameters for the release of information to approved buyers; allowing the centralized market to manage rules during the exchange and provide for clearing and settlement of federated data (signals) for multiple participants and/or multiple federated data sources which act in concert toward a common objectives, with each participant paid based upon value delivered, observed externally or price agreed to.

By way of example and not limitation, the signal marketplace rules include registration of participants, construction of signals, management of agreements, enforcement of rules, destruction and safeguarding of data, purchase of signals, use of signals, tracking of signal performance, clearing and settlement, marketplace history, tracking reputation of signals and all participants, involvement of indirect specialists and agents, dispute process, participant responsibilities, and other significant areas. Given that the price of signals is unknown to any given buyer, the prospective buyer must first issue a request for the signal combined with an offer or request for quote to a signal seller. The request for quote contains information necessary for the seller to determine price and establish bid-response communication protocol. Sellers respond with a request for quote (RFQ) response or no response. If there is an RFQ response it can include acceptance or alternate terms. Upon receiving the RFQ response the buyer may propose alternate terms until an acceptance is issued by the seller via the network-based communications between distributed computing devices. Upon receiving the accepted RFQ message from the seller, the buyer issues a binding purchase confirmation after which the seller confirms receipt and respond with the delivery of the signal(s) in the timeframe specified. Signals can be transmitted in any volume defined within the purchase confirmation. By way of example and not limitation signal pricing can consist of both fixed price and price based upon an objective measured within the marketplace. The marketplace embodying the invention provides an anonymous trading system having a communicating network for transmitting electronic messages between distributed computers of signal sellers and signal buyers. A plurality of order input devices such as buyer and seller terminals are connected to the communication network. Each signal order device may generate price quotation messages, which include bid and/or offer prices and may communicate estimated price and analytics information to a buyer, or work with a central marketplace for order matching. A plurality of seller rules and pricing engines are connected to the network, to discover data, optimize purchases, and match bids and offers. Exchange of signals information can be accomplished in a locally managed agreement with a buyer outside of the marketplace. Or within marketplace which serves as the central clearing and settlement system for the execution of contracts and exchange of signals, during which history and transaction records are maintained. Within an advertising use of signals, at least one of party within the transaction is a publisher 400 (illustrated in FIG. 2), which is responsible for communicating with one or more consumers. The use of signal information, or activity by the publisher which was the result of signal information is tracked separately by the seller, the buyer and the marketplace. By way of example and not limitation, a grocery store X is a signal seller of men's shaving preferences, with Proctor and Gamble's Gillette as the signal buyer, in an advertising campaign managed by Ogilvy and Mather, and published in Facebook. Olgivy and Mather request signals from Store X Affinity to a competitor Schick for use to promote Gillette. Store X enters into an agreement to sell the shaving signal and responds to requests for any given consumer AFFINITY TO SCHICK [Value, Frequency, Recency] for each consumer. This signal data is combined with other data within the campaign manager and an offer is sent to each targeted consumer. Each offer contains a unique code or identifier, tying it to the campaign and to the signals usage. The signals used within the campaign can be tracked for each offer published, and for Consumers who redeem the offer with the unique code or identifier.

Trackable behaviors are defined within the marketplace and may include by way of example and not limitation: purchase with one time use code, purchase with credit card, location, registration, viewing of a web site, opening of email, phone call or viewing of a television show or commercial. Marketplace rules require participants to record defined behaviors and object identifiers, which are correlated to a signal, object, event or behavior. By way of example and not limitation, an objective behavior for an automotive advertiser is consumer presence in an automotive show room. The automotive show room has a Wi-Fi hot spot which identifies devices which are present. The Wi-Fi hotspot is a signal provider. The presence signal for any given device identified by the Wi-Fi provider is of value to the campaign manager. Hence the Wi-Fi provider sells data to the automotive campaign manager.

Within the signals marketplace or virtual marketplace or exchange, signals from multiple sources can be combined to identify objects. Similarly, object correlation to other objects, object correlation to behaviors, object correlation to events, object correlation to states, are tracked so that the marketplace requests will match corresponding data. By way of example and not limitation, objects such as: a person, a car, and a computer can all be correlated. Each of these objects can also have behaviors that can be correlated using a correlation engine, which may be provided in the centralized server computer or distributed among computers in communication over a network.

By way of example and not limitation if the signal AFFINITY_TO_CITY (New York) was combined with AFFINITY_TO_THEATER the target audience of likely Broadway ticket purchasers could be developed. A statistical engine within the marketplace cross correlates signal performance for any given objective. The statistical engine assesses the performance of signals both in isolated and combined usage, thus retaining the ability to assess value for a single signal within the marketplace and its participants. In addition to combining signals, the marketplace statistical engine also includes random samples of other signals. Thus, signal sellers are required to support analytics driven requests for their signals data to assess the cross correlation of signals. In this way the marketplace may make automated suggestions of alternate data sources which may improve price-performance of a given objectives.

Figure 2:
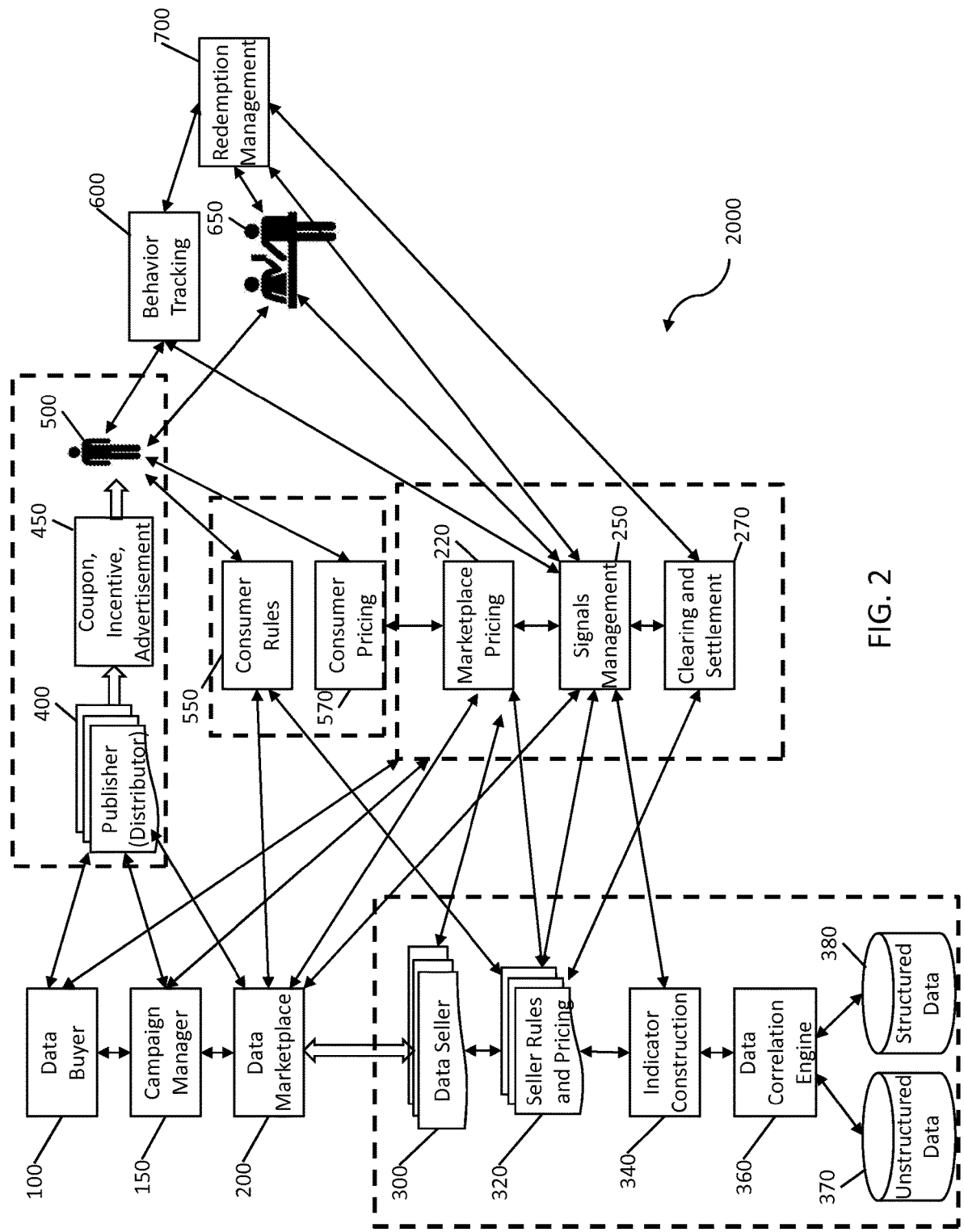
FIG. 2 is a schematic diagram of an embodiment of the invention.

As illustrated in FIG. 2, the schematic diagram illustrates components within a signal marketplace and/or exchange of signals between signal sellers and signal buyers, and methods or processes associated with their interaction.

Federated Data Centralized Intelligence. With any given seller correlations can be held remotely with object behavior and state estimated from both internal and external data. Significantly, this remote data correlation is shared with the centralized marketplace to assist with buyer discovery and object feedback. This approach allows each signal seller to control their data within their own environment, and perform analysis locally to provide a standardized result set to data buyers. This standardized result set provides security to the owner of the data as to not allow unapproved usage and further dissemination. The result set and marketplace allow for the tracking of the benefit that this signal or indicator provided to a given objective (example: marketing campaign). It also allows the seller to control the price of the response based upon the benefit to which it provides, understanding that it will provide different benefits to different buyers and different usages.

The computer-implemented method for indexing distributed data in a distributed data network in which file metadata and signal types related to unique keys are temporarily centralized within a marketplace. The method of invention calls for assigning and using a unique key to identify signals, which correlates to the key and returns it to the marketplace where it can be combined with other data sources. A key-value store built up in rows for the marketplace metadata, and updated by each node through response and direct participant edits. Each of the rows has a composite row key and a row value pair, also referred to herein as key-value pair.

Also, as illustrated in the figures, in particular in FIG. 1 and FIG. 2, a method of construction of signals/indicators directly between signal sellers and signal buyers and/or within a data marketplace to express: event, object state, change in state, behavior of an object, relationship to another object, relationship to a behavior, economic indicators, relevance to an objective, near-real-timeliness, frequency, recency, predictive accuracy, fidelity, reputation of the signal, reputation of the seller, affinity to a target, usefulness to an objective, and combinations thereof of a given input value is illustrated (generally referenced 2000 in FIG. 2), including the following:

Pricing signals data (signals) within a market of buyers and sellers based upon performance of indicators toward an objective.

A self-organizing network for construction and exchange of signal information between signal sellers and signal buyers.

A method of using data indicators from one or more sources each source priced separately within a data marketplace to target consumers in campaigns operating through one or more advertising publishers. (Advertiser 100, Campaign Manager 150, Signal Data Marketplace 200, Marketplace Analytics 250, Publisher (Distributor) 400), in particular for campaign management, which may further include consumer 500 permissions including Consumer Rules 550 and Consumer Pricing 570, and other Seller-based components 300, including Seller Rules and Pricing 320, Signal or Indicator Construction 340, Seller Data Correlation Engine 360, Seller Unstructured Data 370, and Seller Structured Data 380).

The present invention systems and methods may further include the following: Performance based advertising within a signal data marketplace 200 with publishing targeted and traceable advertising based upon information sourced from the signals marketplace or exchange. Examples of traceable advertising include one-time use codes, coupons, discounts, loyalty, mobile application behavior, location, digitally stored incentives, and combinations thereof 450.

Registration of signal providers (data sellers) in a shared directory 200-300.

Registration of signal types offered by signals providers in a shared directory 300, 320, 340, 360.

Registration and participation of advertisers (signal buyers) in a signals marketplace or exchange 100, 150, 200.

Registration and participation of content distributors in a signals marketplace or exchange 400, 200.

Registration and participation of consumers in a signals marketplace or exchange 500-550, 200.

Method of governing exchange of consumer information within a data marketplace that is dependent on consumer permission and consumer defined fees 550-200.

Rules governing the exchange of signals in a marketplace 200.

Creation of advertising campaigns using distributed signals, i.e., wherein the signals are provided from different sources.

Method of automated signal selection within a data marketplace, based upon signal price performance and relevance.

The Method of communicating signal performance and pricing information within a marketplace (marketplace analytics 250).

The method of purchasing remote signals via dynamic pricing in a bid/response within a federated marketplace 220.

Method of tracking the performance of federated indicators/signals within a data marketplace, based upon behavior (e.g., web site visit), location, card transaction information, redemption codes, loyalty cards or other external object observations, and events.

Method of pricing indicators within a data marketplace based upon behavior 600 web site visit, social sharing, location, card transaction information 650, redemption codes, and loyalty cards, as illustrated in FIG. 2.

Method of settling payment between buyer and seller 700, 320, 270, 150, 100 based upon redemption, coupon, one time code, payment, location, registration or other purchase information to confirm consumer behavior within a distributed data marketplace.

Identification of consumer marketing channel preference through signal availability, point of sale purchase information and other redemption information.

Use of consumer location information to inform effectiveness of advertising within a signals marketplace.

Use of encrypted credit card to confirm purchase within an advertising campaign in a federated signals marketplace.

Use of encrypted credit card information to inform object behavior for multiple buyers in a federated marketplace.

Use of encrypted consumer ID within retailer purchase history to confirm purchase within an signals based advertising campaign Technical interaction and message exchange between signal buyers and sellers.

Process of exchanging requested purchase of data from a data provider within a data marketplace.

Statistical method for optimizing signal selection for advertising campaigns operating with a signals marketplace or exchange.

Statistical method for optimizing advertising distribution channel based upon signal information held by a multitude of participants in a federated signals marketplace.

Method of defining campaign types supported by signal marketplace. Campaigns can begin with target or campaigns can be managed by distributor in a bid for consumer access by competing campaigns.

Protection of consumer information in shared signals, and further including steps for protecting consumer anonymity in the exchange of signal information.

Clearing and settlement of signal exchange between participants in a marketplace based upon signal purchase agreements and signal performance information.

Method restraining signal exchange through rules based upon local laws of each transaction participant.

Method of selling indicators through marketplace agreements with price based upon advertising performance.

Method of Sharing revenue for consumer purchases with signal providers based upon measured object behavior, events, object states, or object performance 600.

Method of Settlement of financial obligations in a data marketplace which may include unique signal identifiers, signal agreements, consumer behavior, consumer payment, seller flat fees, seller performance fees, and consumer revenue sharing 270.

Figure 3:
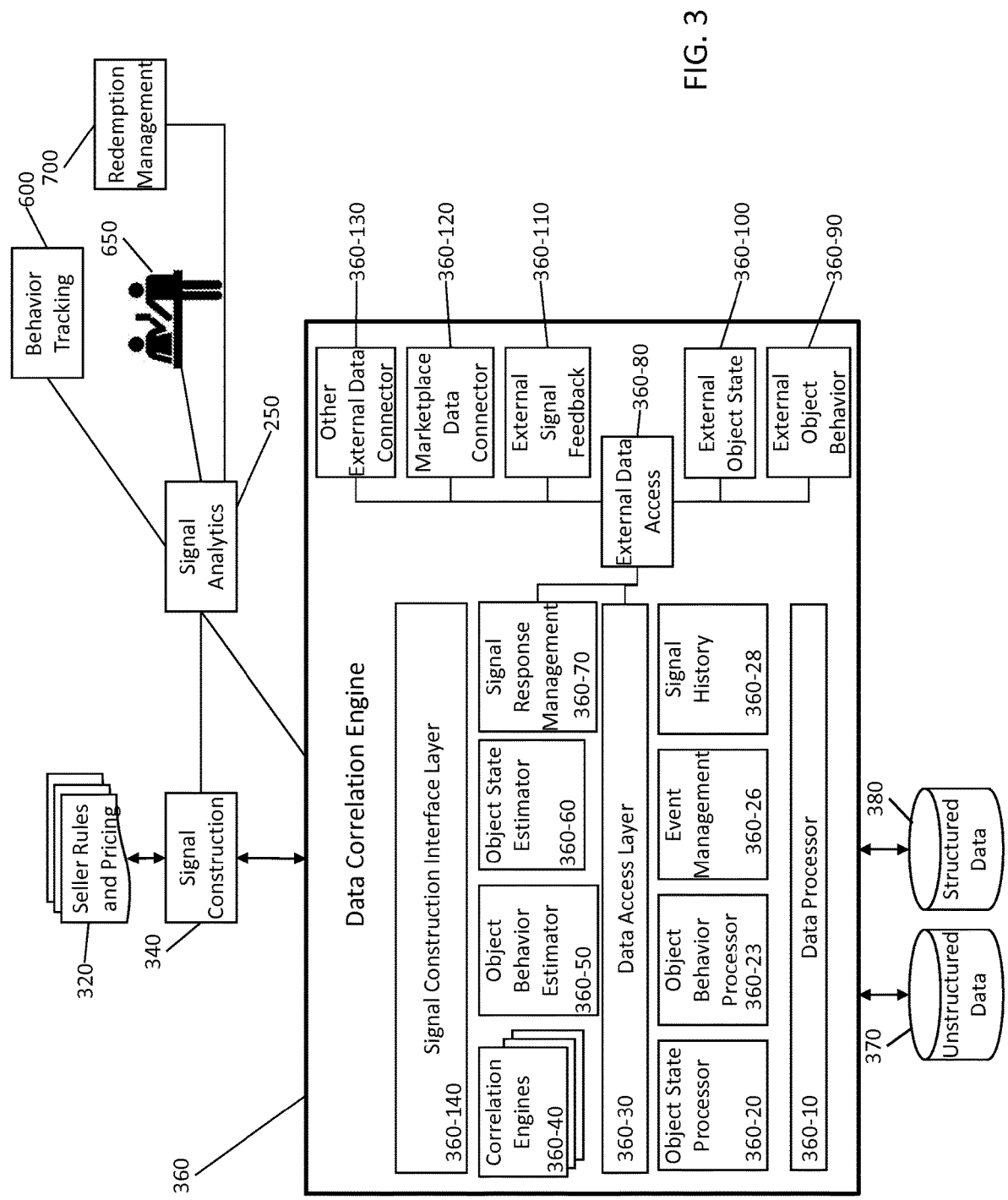
FIG. 3 is a schematic diagram of an embodiment of the invention.

Referring now to FIG. 3, a signal data correlation engine 360 is illustrated including the components of a signal correlation interface layer 360-140, a signal data access layer 360-30 and a data processor 360-10; wherein the signal correlation interface layer 360-140 further includes: a correlation engine 360-40, an object behavior estimator 360-50, an object state estimator 360-60, a signal response management 360-70 having external data access 360-80. The signal data access layer further including an object state processor 360-20, an object behavior processor 360-23, an event manager 360-26, and signal history 360-26. The external data access is further related to external signal feedback 360-110, a marketplace data connector 360-120, an other external data connector 360-130, an external object state 360-100, and an external object behavior 360-90. The signal construction 340 from unstructured data 370 and structured data 380 also relates to the signal/seller data correlation engine 360 and seller rules and pricing 320. Signal analytics 250 is related to the data correlation engine 360 as well as behavior tracking 600 of behavior (including by observer) 650 and in the case of advertising, redemption management 700.

The object behavior estimator uses one or more statistical engines to predict behavior of an object based upon remote data, history and external signals (which represent events or stimuli). Objects such as people have a current state (in transit, having a baby, sitting at home) and historical behavior patterns that are both dynamic and complex. For example, historically when a person (Joe) travels to Chicago he has historically flown by United Airlines, stays at a Marriott, and eats at a steak chain restaurant for dinner. This information is held by many observers such as airlines, credit card companies, hotel chains, mobile phone companies, etc. Thus the object Joe has behaviors that are correlated to travel to Chicago. One observation of Joe in Chicago, or travelling to Chicago may be sufficient to estimate behavior by a multitude of observers.

Observers which sell their observations in the data marketplace are signal sellers. There are two primary flows by which a Signal Sellers (or signal owners) interact with a Signal Buyer Buyer Initiated Request for Signal, and Seller Initiated Signal.

A Buyer Initiated Signal typically requests predict behavior of an object from historical observation information. For example the signal request of affinity to City, with the object context of the city of Chicago for object Joe, could be sent to an Airline Observer. In this example, the airline observer would correlate their historical travel data on passenger travel to Chicago for object Joe and return information regarding the recency and frequency of Joe's travel to Chicago. An Object Behavior Estimator could further predict the future travel based not only on an Airline observer's historical data, but their data correlated to external data such as a business conference, or another objects actions and behaviors (example Joe always travels with Susan to Chicago). Within the distributed (or federated) signals marketplace, each observer retains the correlation to external data signals, not based upon the data itself. For example the Correlation engines for the airline above would hold both internal correlation of Joe's travel preferences toward an external signal request, and the correlation of airline data to other external objects and behaviors (Susan's travel and conference events). The airline would not know the identity of the object Susan, but only that there is a strong correlation to an external object behavior (Susan is traveling to Chicago). Neither would the airline know that the external event was a specific conference. To summarize, the statistical machines within the data correlation engines and the estimators provide correlation of internal data to external objects and behaviors. These correlations allow for prediction of current state and behavior to external stimuli, with external information protected by the signals construct.

In a Seller Initiated Signal, the observation signal has buyers that have registered for the observation, without historical context. In this model it is the buyer that has correlated an external signal (from the seller) toward an objective. An example of a Seller Initiated Signal is an Airline with a signal Airline-Ticket-Purchase by Object at Time. In this example, the Seller Initiated Signal is an Event, which one or more buyers have chosen to register for within the Signals Marketplace, and the Seller has agreed to terms, which are contained within the Marketplace Contract Management System. For example, when Joe purchases an airline ticket, the Airline (acting as Signal Seller) informs approved signal buyers Marriott and Hilton that Joe will be travelling to Chicago. Event signals are a primary real time mechanism for selling and transferring observations. The signals marketplace provides for the dissemination of approved real time data within the signals metaphor to protect the contents of the information (or underlying data), its usage and performance, and realize value of the information based upon time decay. The signal Purchased-Airline-Ticket has a higher value within 1 second of the event, than at 10 minutes, 10 hours, or 10 days. The marketplace provides for price prediction based upon the time decay, and for measurement of performance of the event signal during its use. For example, if the hotel chain Hilton was able to use the signal Purchased-Airline-Ticket to secure a reservation by Joe, where Joe had previously stayed at Marriott, Hilton received a known value in the incremental sale of that Chicago room. If the Signal Purchased-Airline-Ticket was the only signal used in a campaign to Joe, than the performance of the signal toward the objective is known. If Purchased-Airline-Ticket was used in conjunction with other information the marketplace will calculate the proportional effectiveness of the Airline signal in the context of other signals used.

Figure 4:
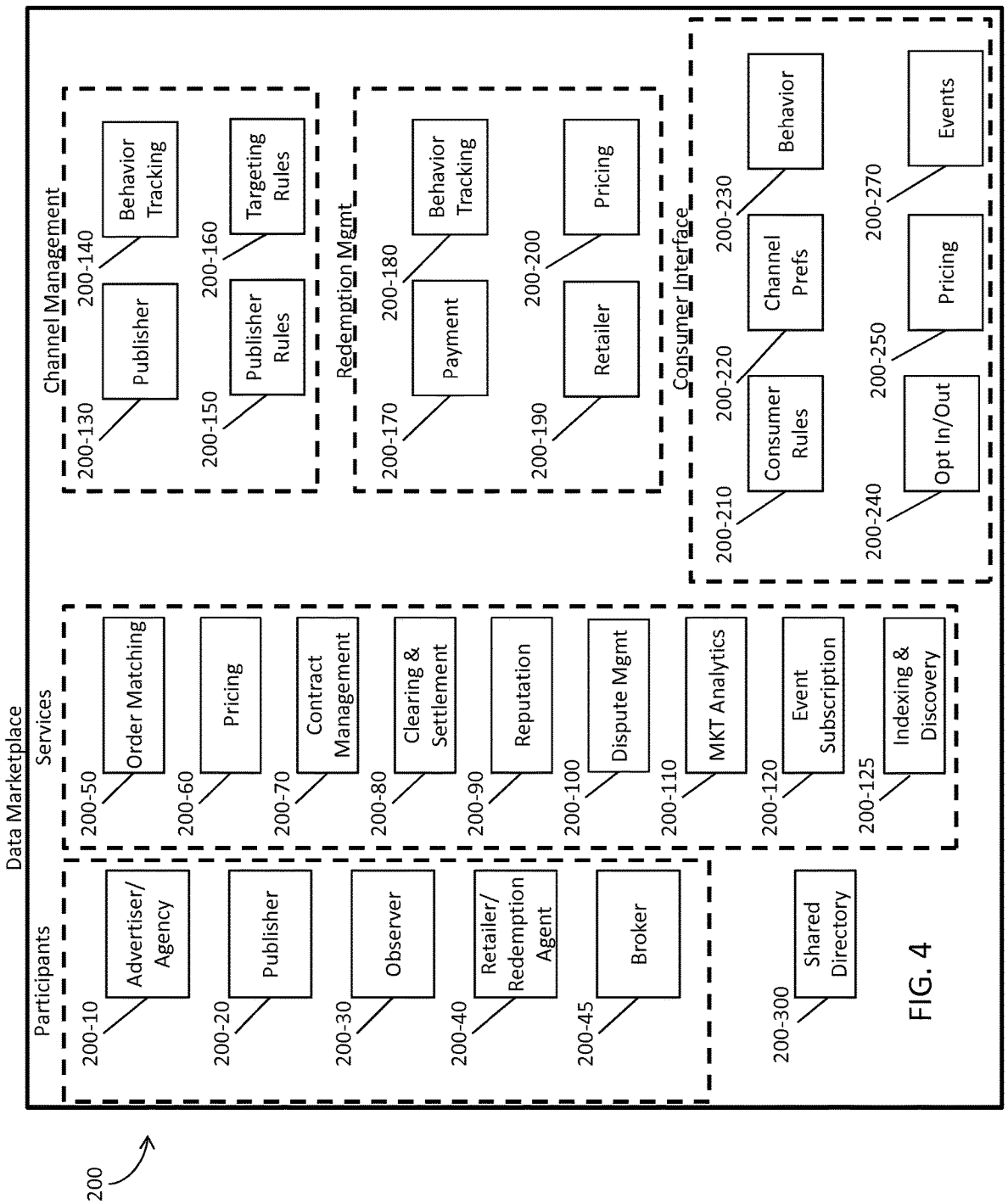
FIG. 4 is a schematic diagram of an embodiment of the invention illustrating components and functions of the signals data marketplace.

Referring now to FIG. 4, the signal data marketplace 200 is illustrated, providing components and relationships for participants, services, channel management, registration management, and consumer interface. For the participants, general examples within and advertising context are illustrated for an advertiser and/or agency 200-10, a publisher 200-20, an observer 200-30, a retailer and/or redemption agent 200-40, and a broker 200-45. For the automated services provided by the remote/centralized server computer for the virtual signal marketplace or exchange, examples are illustrated for order matching 200-50, pricing 200-60, contract management 200-70, clearing and settlement 200-80, reputation 200-90, dispute management 200-100, market analytics 200-110, event subscription 200-120, and indexing and discovery 200-125. For channel management provided by the virtual signal data marketplace 200, a publisher 200-130, behavior tracking 200-140, publisher rules 200-150, and targeting rules 200-160 are provided for automated steps within the signals marketplace or exchange. Functions of redemption management further include payment 200-170, behavior tracking 200-180, retailer 200-190, and pricing 200-200. Functions of consumer interface provided by the virtual signal marketplace include consumer rules 200-210, channel preferences 200-220, behavior 200-230, opt in/opt out 200-240, pricing 200-250, and events 200-270.

By way of additional background for the signal marketplace of the present invention, it is a significant factor how the federated data for the distributed signals is used. As opposed to "sharing lists" and joining information within a single database. Federated data keeps raw data localized with the owner responsible for disclosure, usage, pricing, security, and privacy. Within a data marketplace federated data providers (sellers) use signals as a way to protect sensitive information. Signals (or indicators described hereinabove) are a type of meta data indicators that are based upon information in control of the data sellers. These signals or indicators require input context and are sold for purposes explicitly defined within the signal marketplace. For example, in an AFFINITY_TO_CITY signal example, consumer flight records are never shared nor is the traveler's current location, rather the signal response can reflect how often or how recently an object was associated with a given city. Signals create scarcity and enable control both of which are critical in any functional marketplace. The value of any good is dependent on quality, availability, use, alternatives and price. The virtual signal marketplace performs analysis on signal results to determine effectiveness and value. This analysis and effectiveness information is communicated to all participants, which informs the market of potential buyers and sellers.

The efficacy of a signal is dependent upon the following factors or considerations: a) the signal's owner must have sole discretion to permission access, price, restrict usage and dissemination; b) the exchange of signal information must be and secured from external observation to protect against data leakage and tampering, since there can be no efficient market for the data or signals if they can be obtained elsewhere at a lower cost; c) each signal must be retain information on its identity, ownership, destination, rules and usage constraints enforced through its life cycle of usage by all parties that leverage signals directly or indirectln, d) The signal must contain information that the owner can create and release, e) the use of signal information must be measured which includes information on the buyer, objects, behaviors, states, events, status of agreement with marketplace, agreement with the buyer (if any), consumer constraints (if any), price offered, planned usage, and combinations thereof; the marketplace processes, systems, and services to protect the exchange, assure secure delivery, track usage, track value generated, settle funds, issue receipt, deliver auditability; and combinations thereof.

There are different control requirements on "consumer information" (or personally identifiable information or PII), proprietary information, object behavior information, object state information and other generic information. Some of these control requirements are driven by regulatory issues or requirements. Some information can only be exchanged to another party where an agreement is in place (i.e., a closed market). The control elements of a signal include the following: a) Signal type: Open, Restricted, PII; b) Signal Price: Market, floor; value generated c) Buyer Information or profile; c) consumer consent information (if any).

Figure 5:
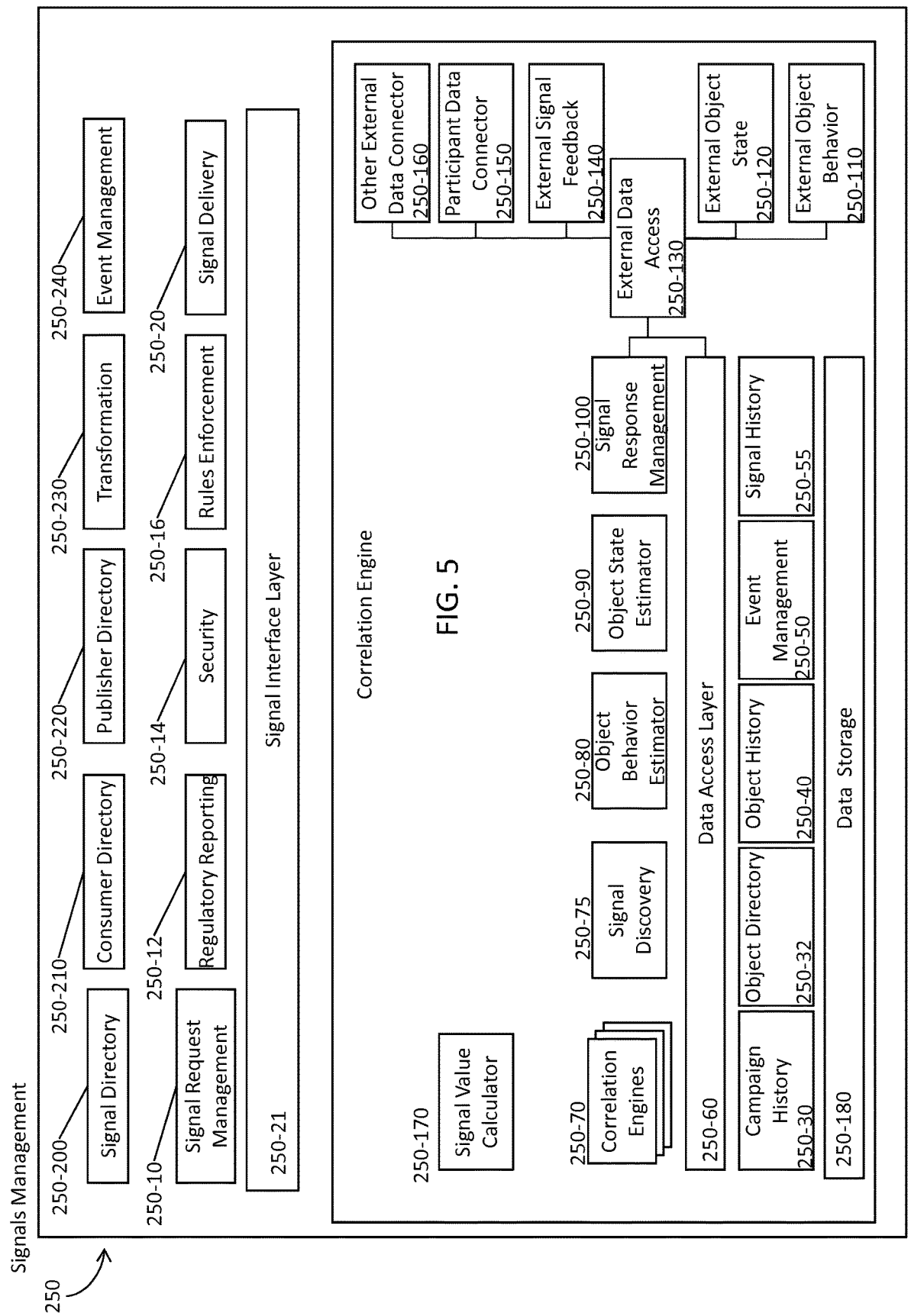
FIG. 5 is a schematic diagram of an embodiment of the invention illustrating components and functions relating to signals management.

FIG. 5 is a schematic diagram of an embodiment of the invention illustrating components and functions relating to signals management, generally referenced 250. The components include: Signal Directory 250-200; consumer Directory 250-210; Publisher Directory 250-220; Transformation 250-230; Event Management 250-240; Signal Request Management 250-10; Regulatory Reporting 250-12; Security 250-14; Rules Enforcement 250-16; Signal Delivery 250-20; Signal Interface Layer 250-21; and a Signal Management Correlation Engine further including 250-170; Correlation Engines 250-70; Signal Discovery 250-75; Object Behavior Estimator 250-80; Object State Estimator 250-90; Signal Response Management 250-100; External Data Access 250-130; External Object State 250-120; External Object Behavior 250-110; Other External Data Connector 250-160; Participant Data Connector; 250-150; External Signal Feedback 250-140; and Data Storage 250-170.

After defining the signals to sell, and registering their corresponding rules and constraints, signals information is exchanged within the virtual signal marketplace. There are five (5) primary data flows between a signal provider and the signal marketplace or signal exchange, including:

1) RFQ. Request for quote. In this data flow, a prospective buyer will request a price from the signal provider. The signal buyer provides: ID, signal(s) requested, input parameters (e.g., destination city, campaign type, price offered (per item and per success), time, expiry time, minimum fill, maximum, settlement. Along with this information the signal marketplace or signal exchange will also provide Buyer ID reputation information.
2) RFQ Response. Signal provider will either respond with an acceptance of order and time/quantity to fill, or a respond with alternate price/denial. The signal marketplace or signal exchange provides "optional" seller side software to manage this interaction. Rules surrounding minimum price, data effectiveness and buyer ID are incorporated to response. If offer is accepted, signal marketplace or signal exchange will begin tracking of the transaction order.
3) Purchase Confirmation. Buyers will issue purchase confirmation for approved RFQs. Within our marketplace agreement, a purchase confirmation is a commitment by the buyer to pay for information within the terms of the Commerce Signals Marketplace Agreement.
4) Signal Delivery. Signal provider provides the signals and buyer confirms receipt
5) Settlement. Transaction Reference number, quantity provided, time provided, item fees (if any), redemption fees (if any), redemptions to date, redemption expiry period, amount paid, amount paid to date, dispute reference numbers, receipt confirmed.

The present invention creates a virtual market for data, wherein the underlying or actual data has been transformed into signals or indicators to protect the underlying data, while still providing information relating to the data that is actionable by signal buyers. Each data seller can develop their own signals or indicators, controlled by their own rules and corresponding correlation engine(s), which data they wish to sell to the outside world. For example a retailer could develop a signal "affinity for golf" with a result of 0-1. Consumers who buy golf balls, golf equipment would have a stronger signal based upon affinity. Golf marketers could subsequently use this information to better inform advertising, in particular for targeted advertising campaigns.

Signal buyers participate directly with signal sellers and/or in the marketplace to identify objects that they wish to influence or measure. Other entities, such as campaign managers, publishers, media companies take different roles in the measurement and influencing of the behavior of objects through the use of signal information. The virtual marketplace supports both buyer led transactions and seller led transactions. By way of example and not limitation seller led campaigns can begin with a publisher that has a relationship with a consumer of a given profile. Buyers can bid for the influencing the behavior of that consumer through the marketplace. Marketplace participants can assume multiple roles such as buyer, seller, and distributor.

Regardless of signal or indicator construction, signals must be registered to participate in the signal marketplace. To provide security to protect the signals within the marketplace, and to control signal dissemination or access and distribution to signals registered in the signal marketplace, multiple object identifiers can be used. By way of example and not limitation these include encrypted forms of e-mail address, card number, phone numbers, device ID, location, loyalty card and address as key for purchase of information from a seller. Thus the data seller or signal provider controls the information that is shared within the marketplace and with prospective buyers. These controls relate to access, viewing, downloading, copying, etc. and combinations thereof.

Technical communication protocols for signals include writing data of the buyer into a buyer computer application; notifying buyer computer application to send XML file when data has been written to the marketplace order computer application data file by the buyer computer application; monitoring the marketplace order computer application queue from the marketplace execution application for notification that data has been written to the data file by the buyer computer application; reading the data of the buyer computer application data file from the marketplace execution computer application upon detection of notification; notifying marketplace order computer application to send XML file when data has been written to the seller computer application data file by the marketplace order computer application; monitoring the seller computer application queue from the marketplace order application for notification that data has been written to the data file by the marketplace order computer application; notifying a buyer computer application read file when data has been read by the seller computer application from the marketplace order computer application data file; monitoring the seller read file from the marketplace order computer application for notification that data has been read from to the buyer computer application data file by the seller computer application to initiate further writing to the marketplace order computer application data file.

Figure 6:
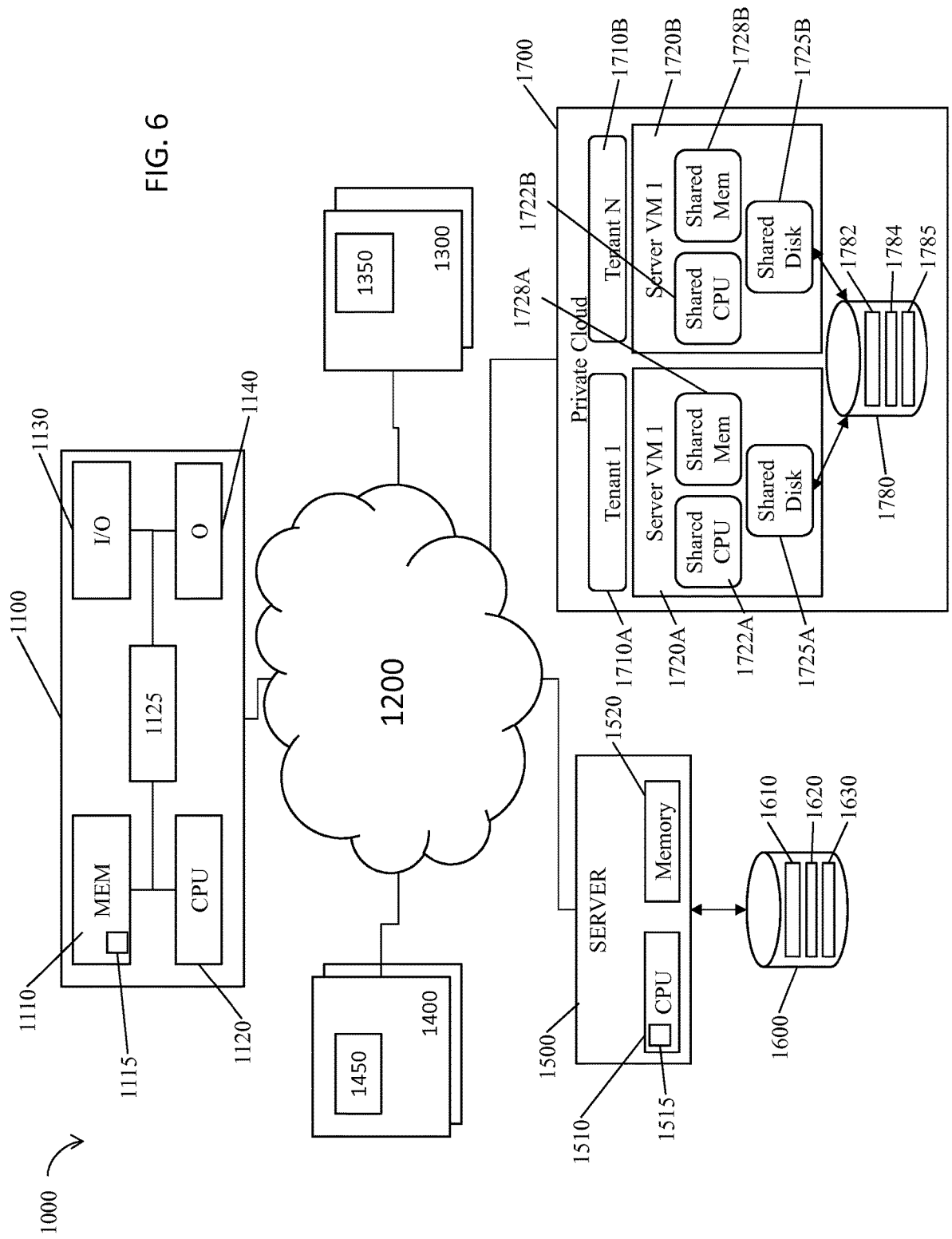
FIG. 6 is a schematic diagram illustrating a virtualized system for the present invention.

As illustrated in FIG. 6, the system 1000 is comprised of both dedicated servers 1500 and servers operating within a private cloud 1700. The dedicated servers 1500 contain: processing units 1510, memory 1520 data storage 1600. Dedicated servers 1500 are constructed, configured and coupled to enable communication over a network 1200. Servers 1720 operating within a private cloud 1700 leverage shared processing units 1722A, shared memory 1725A and shared disk 1728A are also configured and coupled to enable communications over a network 1200. The dedicated servers 1500 and cloud servers 1700 provide for user interconnection over the network 1200 using computers 1110 positioned remotely from the servers. Furthermore, the system is operable for a multiplicity of remote computers or terminals 1300, 1400 to access the dedicated servers 1500 and servers 1720A operating within a private cloud 1700 remotely. For example, in a request and reply architecture devices registered to marketplace participants may interconnect through the network 1200 to access data within dedicated servers 1600 and within the private cloud 1780. In preferred embodiments, the network 1200 is the Internet, or it could be an intranet, or any other network suitable for searching, obtaining, and/or using information and/or communications, including receiving the notification and providing a response.

The system of the present invention further includes an operating system 1515 installed and running on the dedicated servers 1500, enabling servers 1500 to communicate through network 1200 with the remote, registered devices. The operating system may be any operating system 1515 known in the art that is suitable for network communication. A memory within dedicated servers 1520 is interconnected with the server 1500. Memory 1520 may be integral with server 1500 or may be external to the server and interconnected therewith. A program of instruction 1620 is resident in memory 1520 within the parameters set by the operating system 1515 which accesses persistent storage 1600.

The system of the present invention further includes servers 1720A which support multiple tenants 1710A within a private cloud 1700 that share system resources through multiple virtual machines 1720A. Each virtual machine 1720A consists of an operating system installed and running on shared processing units 1722A, shared memory 1725A, shared persistent storage 1728A which access programmatic and user data 1782. The private cloud 1700 communicates through the network 1200 with remote registered devices. The operating system and virtual machines 1720A may be any such kind known in the art that is suitable for managing multi-tenant cloud services and network communication. Memory 1725A within shared cloud infrastructure is interconnected with each associated virtual machine 1720A according to the operating system running within the processing unity 1722A. A program of instruction 1782 is managed within memory 1725A upon retrieval by disk management 1728A within the parameters set by the operating system 1720 and virtual machine. Additionally, the following components are illustrated in FIG. 6: device 1100, instructions 1115, processor 1120, input/output interface 1130, bus 1125, memory 1350, 1450, instructions 1610, 1785 applications 1630, 1784, tenant N 1710B, server VM N 1720B, shared memory 1722B, shared disk 1728B and shared CPU 1725B.

Figure 7:
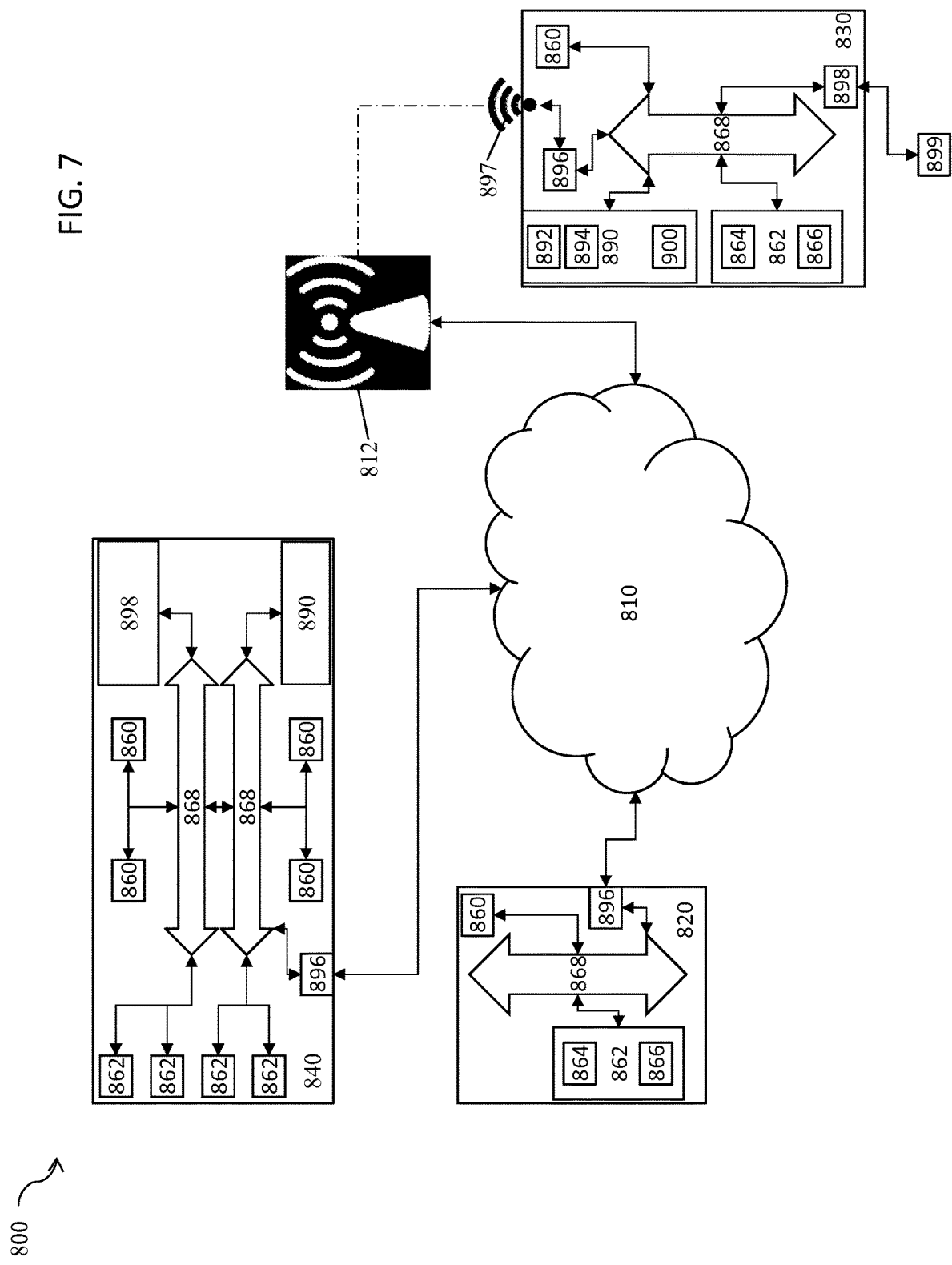
FIG. 7 is another schematic diagram illustrating a virtualized system for the present invention.

Additionally or alternatively to FIG. 6, FIG. 7 is a schematic diagram of an embodiment of the invention illustrating a computer system, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital devices 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 7, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage device 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 7 may include other components that are not explicitly shown in FIG. 7 or may utilize an architecture completely different than that shown in FIG. 7. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method for managing indicator constructs in a virtual marketplace system comprising a plurality of networked computers connected over the Internet, the method steps comprising:
  a data source computer creating raw data and storing the raw data on a memory of the data source computer;
  the data source computer constructing at least one indicator construct from the raw data on the data source computer, the raw data including structured data and unstructured data;
    wherein the unstructured data and the structured data include records of interaction with one or more objects, wherein the at least one indicator construct represents the raw data without being the raw data and without disclosing the raw data, and wherein the raw data remains localized on the data source computer;
    wherein the at least one indicator construct is constructed in a form that is relevant for a given objective, wherein the at least one indicator construct provides for privacy protection for the one or more objects such that the at least one indicator construct does not disclose identities of the one or more objects, wherein the at least one indicator construct anonymizes the one or more objects by correlating the at least one indicator construct with a common identifier associated with the one or more objects and assigning the common identifier to the at least one indicator construct, wherein the common identifier does not disclose identities of the one or more objects and other personally identifiable information;

wherein each of the at least one indicator construct conforms to a common structure, wherein the common structure includes a source, a destination, a transaction identifier, a transaction time, a delivery channel, and a payload;

providing the at least one indicator construct by sending the at least one indicator construct and the common identifier to a centralized database over a network, wherein the at least one indicator construct originates from the data source computer and the at least one indicator construct is controlled by an indicator construct owner;

wherein the at least one indicator construct is based upon at least two factors associated with the one or more objects, wherein the at least two factors relate to one or more states of the one or more objects or one or more behaviors of the one or more objects, and wherein the one or more states of the one or more objects include a state of a person and the one or more behaviors of the one or more objects include a behavior of the person;

wherein a value of the raw data decays over time with respect to relevance to the given objective created by an indicator construct buyer computer;

wherein the at least one indicator construct is protected against data leakage and tampering; and wherein an effectiveness of the at least one indicator construct towards the given objective depends on a level of control of the data source computer over the at least one indicator construct to determine access to the at least one indicator construct, restrict usage of the at least one indicator construct, and restrict dissemination of the at least one indicator construct;

correlating the at least one indicator construct and the common identifier to corresponding external requests and external object observations and feedback to create indicator construct correlations on a remote server computer;

providing and storing an indicator construct index in the centralized database based on the indicator construct correlations, wherein the indicator construct index includes indicator constructs constructed from distributed information and data from different distributed data sources controlled by different owners, wherein the indicator construct index includes the at least one indicator construct, and wherein each indicator construct in the indicator construct index conforms to the common structure, thereby creating a common taxonomy for exchange of the indicator constructs, wherein the common taxonomy includes behavior indicator constructs or state indicator constructs;

wherein the indicator construct index provides for automated real time matching with buyer candidates having corresponding objectives for buying the at least one indicator construct, wherein the corresponding objectives include consumer behaviors, events, object states, and/or object performances;

defining an effectiveness of the at least one indicator construct towards the given objective through the virtual marketplace system;

the data source computer defining a predetermined use of the at least one indicator construct;

determining and assigning a value to the at least one indicator construct based on the predetermined use and the given objective, wherein the at least one indicator construct is constructed to be bought or sold via the virtual marketplace system for a price based on the value of the at least one indicator construct;

updating a listing of the remote and centralized indicator construct indices;

the indicator construct buyer computer providing input parameters for the at least one indicator construct and requesting the price of the at least one indicator construct;

the data source computer providing an offer response based on the input parameters including a virtualized agreement with terms for use of the at least one indicator construct created through the virtual marketplace system by the indicator construct buyer computer and the data source computer;

the indicator construct buyer computer accepting the offer response and the virtualized agreement for the at least one indicator construct provided by the data source computer;

the data source computer issuing a purchase confirmation for the at least one indicator construct;

transmitting the at least one indicator construct over the network to the indicator construct buyer computer for the predetermined use;

tracking the at least one indicator construct for a benefit that the at least one indicator construct has provided to the given objective, wherein the benefit includes a behavior of the object after delivery of the at least one indicator construct to the indicator construct buyer computer; and monitoring use of the at least one indicator construct for the predetermined use by the indicator construct buyer computer and third party observers.

2. The method of claim 1, wherein the feedback includes feedback on economic measurements.

3. The method of claim 2, further including the step of automatically adjusting the indicator construct correlations of the at least one indicator construct based on the feedback.

4. The method of claim 2, further including the step of updating the centralized indicator construct index to include the feedback.

5. The method of claim 1, further including the step of receiving information from indicator construct buyers confirming receipt of the at least one indicator construct and compliance with the predetermined use of the at least one indicator construct.

6. The method of claim 1, further including the step of automatically correlating the indexed at least one indicator construct to requests of distributed indicator construct buyers.

7. The method of claim 1, wherein the at least one indicator construct includes information about a change in state, a relationship to another object, a relationship to another behavior, economic indicators, near-real-timeliness, frequency, recency, predictive accuracy, fidelity, and reputation of the at least one indicator construct.

8. The method of claim 1, wherein the at least one indicator construct includes an indicator construct type selected from the group consisting of: state indicator constructs, event indicator constructs, activity indicator constructs, behavior indicator constructs, relational indicator constructs, location indicator constructs, loyalty indicator constructs, purchase indicator constructs, social indicator constructs, performance indicator constructs and combinations thereof.

9. The method of claim 1, further including the step of retaining control of indicator construct data within a defined use of the at least one indicator construct by the indicator construct buyer computer.

10. The method of claim 1, further including the step of defining use and an agreement to report on a result of use with the indicator construct buyer computer or a counterparty.

11. The method of claim 1, further including the step of releasing indicator construct data to the indicator construct buyer computer.

12. The method of claim 1, wherein the indicator construct owner controls how the at least one indicator construct is created, generated and/or constructed.

13. The method of claim 1, further including the step of monitoring performance of the at least one indicator construct compared with the given objective.

14. The method of claim 1, further including the step of the indicator construct owner selectively sharing information with buyers.

15. The method of claim 1, wherein the steps are made for a multiplicity of indicator constructs and corresponding indicator construct owners.

16. The method of claim 1, further including the step of the indicator construct owner limiting indicator construct availability to indicator construct buyers and/or to the centralized data marketplace based upon a rules engine that enforces limitations by any party in a transaction for the at least one indicator construct.

17. The method of claim 16, wherein the rules engine includes rules regarding: buyer identity, campaign type, indicator construct requested, price, redemption indicator construct type, purchase quantity, past performance of indicator construct, past performance of campaign type, past performance of buyer, and combinations thereof.

18. The method of claim 1, further including the step of linking the indexed at least one indicator construct to relational databases.

19. The method of claim 1, wherein the at least one indicator construct is locally indexed by each indicator construct owner associated with the at least one indicator construct.

20. The method of claim 1, further including the step of the indicator construct owner creating and tracking a corresponding indexed at least one indicator construct.

21. The method of claim 1, further including the step of each indicator construct owner tracking agreements for buying and selling the at least one indicator construct.

22. A system for managing indicator constructs by corresponding indicator construct sellers in a virtual marketplace comprising a plurality of networked computers over the Internet, the system comprising:
- at least one data source computer operable to create raw data and store the raw data on a memory of the at least one data source computer;
- a remote server computer constructed and configured for network-based communication with the at least one data source computer and at least one indicator construct buyer computer;
  - a data correlation engine on the at least one data source computer, wherein the data correlation engine is operable to construct at least one indicator construct, wherein each of the at least one indicator construct conforms to a common structure, wherein the common structure includes a source, a destination, a transaction identifier, a transaction time, a delivery channel, and a payload;
- wherein the data correlation engine is further operable to correlate the at least one indicator construct to at least one encrypted identifier associated with one or more objects;
- wherein the at least one encrypted identifier is assigned to the at least one indicator construct to facilitate transactions between the at least one indicator construct buyer computer and the at least one data source computer;
- wherein the at least one data source computer is operable to send the at least one indicator construct and the at least one encrypted identifier to a centralized database over a network;
- a virtualized agreement between the at least one data source computer and the at least one indicator construct buyer computer, the virtualized agreement defining a retention time of the at least one indicator construct;
  - wherein the data correlation engine on the at least one data source computer is operable to construct the at least one indicator construct using the raw data, the raw data including structured data and unstructured data, wherein the unstructured data and the structured data include records of interaction of the one or more objects with at least one event or at least one activity;
  - wherein the raw data underlies the at least one indicator construct, wherein the at least one indicator construct transforms the raw data into an anonymized form that is relevant for a predetermined use, wherein the at least one indicator construct does not disclose the raw data from which the at least one indicator construct is constructed, wherein the at least one indicator construct represents the raw data without being the raw data, and wherein the raw data remains localized on the at least one data source computer;
  - wherein the at least one indicator construct is constructed in a form that is relevant for a given objective in at least one advertising campaign, and wherein the at least one indicator construct provides for privacy protection for the one or more objects such that the at least one indicator construct does not disclose identities of the one or more objects;
  - wherein the one or more objects are one or more persons or are related to one or more persons;
  - wherein the at least one indicator construct is associated with a behavior or state of the one or more objects, wherein the at least one indicator construct is indexed and anonymized from a data source of the at least one indicator construct and the at least one indicator construct includes a value selected from the group of a recency, a frequency, a location, and a monetary measure relating to a counterparty, wherein the value is derived from the predetermined use and a value of the at least one indicator construct towards the given objective;
  - wherein a centralized database of the remote server computer is operable to receive the at least one indicator construct and the at least one encrypted identifier sent by the at least one data source computer for use in advertising, wherein the at least one indicator construct is controlled by an indicator construct owner;
  - wherein the remote server computer is operable to identify the at least one indicator construct by matching the at least one encrypted identifier to a key value pair stored in the centralized database of the remote server computer;

wherein the at least one indicator construct is constructed to be bought or sold in the virtual marketplace comprising the plurality of networked computers over the Internet;

wherein the at least one indicator construct buyer computer is operable to provide input parameters for the at least one indicator construct and request a price of the at least one indicator construct;

wherein the at least one data source computer is operable to provide an offer response based on the input parameters for the at least one indicator construct, the offer response including a virtualized agreement with terms for use of the at least one indicator construct created through the system by the at least one indicator construct buyer computer and the at least one data source computer;

wherein the at least one indicator construct buyer computer is operable to accept the offer response and the virtualized agreement provided by the at least one data source computer;

wherein the at least one data source computer is operable to issue a purchase confirmation for the at least one indicator construct;

wherein the at least one data source computer is operable to transmit the at least one indicator construct over the network to at least one indicator construct buyer computer for the predetermined use in the at least one advertising campaign;

wherein the at least one data source computer is further operable to index the at least one indicator construct toward one or more possible uses;

at least one indicator construct buyer application on the at least one indicator construct buyer computer operable to:
 receive request data, wherein the request data includes a request for the at least one indicator construct, an information payload including a planned usage, an expiry time, a minimum fill, a maximum fill, and a reference point;
 write the request data into the at least one indicator construct buyer computer application; and
 write the request data to a data file of a marketplace order computer application on a marketplace order computer;

wherein the marketplace order computer application is operable to prompt the at least one indicator construct buyer computer application to send a requestor XML file to the marketplace order computer application;

wherein a marketplace execution application on the marketplace order computer is operable to:
 monitor a queue of the marketplace order computer application for notification that the request data has been written to the data file of the marketplace order computer application on the marketplace order computer; and
 read the request data of the data file of the marketplace order computer application;

wherein the marketplace order computer application is further operable to write the request data to a data file of an indicator construct seller computer application on the data source computer and send an indicator construct XML file to the indicator construct seller computer application;

wherein the marketplace execution application is further operable to monitor the queue on the marketplace order computer application for notification that the request data has been written to the data file of the indicator construct seller computer application; and wherein the marketplace order computer application is further operable to monitor an indicator construct read file from the marketplace order computer application for notification that the request data has been read from the requestor computer application data file by the indicator construct seller computer application, track a viewing of a website or an opening of an email, and correlate the viewing of the website or the opening of the email to the at least one indicator construct;

wherein the data correlation engine is further operable to correlate the at least one indicator construct to external requests, external object observations, and feedback to create indicator construct correlations;

an indicator construct index associated with the at least one indicator construct, which is stored in the centralized database of the remote server computer, wherein the indicator construct index includes the indicator construct correlations, wherein the indicator construct index includes indicator constructs constructed from distributed information and data from different distributed data sources controlled by different owners, wherein the indicator construct index includes the at least one indicator construct, and wherein each indicator construct in the indicator construct index conforms to the common structure, thereby creating a common taxonomy for exchange of the indicator constructs, wherein the common taxonomy includes behavior indicator constructs or state indicator constructs; and a proposed indicator construct value for the predetermined use corresponding to the at least one indicator construct, wherein the predetermined use is defined prior to exchange of the at least one indicator construct and the predetermined use is tracked by a central exchange marketplace for a benefit that the at least one indicator construct has provided to the objective, wherein the benefit includes a behavior of the one or more objects after delivery of the at least one indicator construct to the at least one indicator construct buyer computer;

thereby enabling the central exchange marketplace to deliver the at least one indicator construct for the predetermined use; and wherein the monetary measure relating to the counterparty is based upon near-real-timeliness and usefulness to the objective, wherein the value of the at least one indicator construct decays over time and with respect to relevance to the objective, and wherein the objective is the at least one advertising campaign.

23. The system of claim 22, wherein the remote server computer receives inputs from third party observers that inform the one or more possible uses and correlations across a multitude of participants.

24. A method for managing indicator constructs in a virtual marketplace system on the Internet comprising a plurality of networked computers, the method steps comprising:
 a data correlation engine on a data source computer constructing at least one indicator construct using raw data, the raw data including structured data and unstructured data, wherein the unstructured data and the structured data include records of interaction of an object with at least one event or at least one activity, wherein the object is a person, wherein constructing the at least one indicator construct transforms the raw data into the at least one indicator construct, wherein each of the at least one indicator construct conforms to a common structure, wherein the common structure includes a source, a destination, a transaction identifier, a transaction time, a delivery channel, and a payload;

wherein the raw data underlies the at least one indicator construct, wherein the at least one indicator construct transforms the raw data into a form that is relevant for a predetermined use in at least one advertising campaign, wherein the at least one indicator construct represents the raw data without being the raw data and without disclosing the raw data, and wherein the raw data remains localized on the data source computer;

wherein the at least one indicator construct is based upon at least two factors associated with the object, and wherein the at least two factors relate to a state of the object or a behavior of the object, wherein the object is a person or is related to a person;

wherein the at least one indicator construct is constructed to be bought or sold in the virtual marketplace system comprising the plurality of networked computers over the Internet;

selecting a price of the at least one indicator construct based on a value the at least one indicator construct provides to the at least one advertising campaign;

providing the at least one indicator construct for use in advertising by sending the at least one indicator construct to the centralized database of the marketplace order computer over a network, wherein the at least one indicator construct originates form the data source computer and the at least one indicator construct is controlled by an indicator construct owner;

generating an indicator construct index and indicator construct correlation to objects and external data, and listing the index and associated correlations in the centralized database of the marketplace order computer, wherein the indicator construct index includes indicator constructs constructed from distributed information and data from different distributed data sources controlled by different owners, wherein the indicator construct index includes the at least one indicator construct, and wherein each indicator construct in the indicator construct index conforms to the common structure, thereby creating a common taxonomy for exchange of the indicator constructs, wherein the common taxonomy includes behavior indicator constructs or state indicator constructs;

generating an indicator construct value for value-based exchange of the at least one indicator construct on the marketplace order computer based upon at least two value factors, the at least two value factors selected from the group consisting of: predictive accuracy, fidelity, relevance to the given objective, near-real-timeliness, frequency, recency, relationship of a source of the at least one indicator construct, reputation of the at least one indicator construct, reputation of a seller, affinity to a target, and combinations thereof;

automatically correlating how the at least one indicator construct value decays over time and with respect to relevance to the given objective;

the data source computer anonymizing the at least one indicator construct by correlating the at least one indicator construct to a common identifier and assigning a corresponding at least one unique key to the at least one indicator construct to facilitate transactions between buyers and sellers of indicator constructs;

the data source computer providing the at least one unique key with the at least one indicator construct;

the marketplace order computer identifying the at least one indicator construct by matching the at least one unique key to a key value pair and storing the at least one unique key and marketplace metadata in a key-value store, wherein the marketplace metadata is stored in rows of the key-value store and the key-value store is updated by participants in the virtual marketplace system;

transmitting the at least one indicator construct over the network to an indicator construct buyer computer for the predetermined use in the at least one advertising campaign, wherein the predetermined use includes the at least one advertising campaign;

an indicator construct buyer application on the indicator construct buyer computer receiving request data, wherein the request data includes a request for the at least one indicator construct, an information payload, including a planned usage, an expiry time, a minimum fill, a maximum fill, and a reference point;

writing the request data into the indicator construct buyer computer application;

writing the request data to a data file of a marketplace order computer application on a marketplace order computer;

the marketplace order computer application prompting the indicator construct buyer computer application to send a requestor XML file to the marketplace order computer application;

a marketplace execution application monitoring a queue on the marketplace order computer application for notification that the request data has been written to the data file of the marketplace order computer application on the marketplace order computer;

the marketplace execution application reading the request data of the data file of the marketplace order computer application;

the marketplace order computer application writing the request data to a data file of a data source computer application on the data source computer;

notifying the marketplace order computer application to send an indicator construct XML file to the data source computer application;

the marketplace execution application monitoring the queue on the marketplace order computer application for notification that the request data has been written to the data file of the data source computer application; and monitoring an indicator construct read file from the marketplace order computer application for notification that the request data has been read from the requestor computer application data file by the data source computer application;

tracking a viewing of a website or an opening of an email; and correlating the viewing of the website or the opening of the email to the at least one indicator construct;

constructing at least one second indicator construct based on the subsequent behavior of the object; and delivering the at least one second indicator construct to the indicator construct buyer computer.

25. The method of claim 24, wherein the at least one indicator construct provides a feedback on economic measurements.

26. The method of claim 24, further including the step of automatically updating the listed index and/or creating new listings.

27. The method of claim 24, wherein the at least one indicator construct includes an indicator construct type selected from the group consisting of: event indicator constructs, activity indicator constructs, behavior indicator constructs, relational indicator constructs, location indicator constructs, loyalty indicator constructs, purchase indicator constructs, social indicator constructs, and combinations thereof.

28. The method of claim 24, wherein monitoring use of the at least one indicator construct for the predetermined use by the indicator construct buyer computer and third party observers is performed in accordance with an agreement to report on a result of use by the indicator construct buyer computer with the indicator construct owner.

29. The method of claim 28, further including the step of releasing indicator construct data to the indicator construct buyer computer based upon the agreement between the indicator construct owner and the indicator construct buyer computer.

30. The method of claim 24, wherein the indicator construct owner controls how the at least one indicator construct is constructed and how the at least one indicator construct is used by the indicator construct buyer computer.

31. The method of claim 24, further including the step of monitoring performance of the at least one indicator construct compared with the objective.

32. The method of claim 24, further including the step of automatically determining a relevance to the objective for the at least one indicator construct based on comparison with consumer feedback and consumer behavior.

33. The method of claim 24, further including the step of limiting indicator construct availability based upon a rules engine that automatically considers buyer identity, campaign type, indicator construct requested, price, redemption indicator construct type, purchase quantity, past performance of the at least one indicator construct, past performance of campaign type, past performance of buyer, and combinations thereof.

34. The method of claim 24, wherein the indicator construct value is further based upon consumer feedback and/or consumer reputation.

35. The method of claim 24, further including the step of receiving feedback from the indicator construct buyer computer regarding qualities of relevance, correlation, and/or strength of the at least one indicator construct.

36. The method of claim 24, wherein an indicator construct quality and an indicator construct reputation are automatically generated based upon an assessment of indicator construct performance compared with the objective.

37. The method of claim 24, wherein the at least one indicator construct value depends upon the time of the at least one indicator construct from an event occurrence.

38. The method of claim 24, further including the step of receiving inputs from third party observers that inform as to an efficacy of indicator construct use and correlation across a multitude of participants and multitude of indicator construct uses.

39. The method of claim 1, further including the steps of:
automatically correlating how the value of the indicator construct decays over time and with respect to relevance to the given objective; and
receiving inputs from third party observers that inform as to an efficacy of indicator construct use and correlation across a multitude of participants and multitude of indicator construct uses.

40. The method of claim 1, wherein the data source computer corresponds to the indicator construct owner, wherein the indicator construct owner is a mobile operator and the at least one indicator construct includes mobile browsing activity and mobile phone location.

41. The method of claim 1, wherein the indicator construct owner is a retailer and the at least one indicator construct includes use of encrypted consumer ID within a retailer purchase history to confirm a purchase.

42. The method of claim 1, wherein the indicator construct owner is a bank or a financial institution and the at least one indicator construct includes consumer indicator constructs provided with consumer permissions.

43. The method of claim 1, further including the step of aggregating the at least one indicator construct in a federated model providing for control of the raw data by the indicator construct owner, and allowing a marketplace to establish linkage to a multiplicity of indicator construct owners, with each of the indicator construct owners having control of rules and parameters for a release of the at least one indicator construct to approved buyers.

44. The system of claim 22, further comprising a wireless network hotspot, wherein the data source computer is operable to create the raw data based on the wireless network hotspot detecting a presence of at least one device.

45. The method of claim 24, further comprising the data source computer creating the raw data based on a wireless network hotspot detecting a presence of at least one device.

* * * * *